(12) United States Patent
Zimmerman et al.

(10) Patent No.: US 11,098,747 B2
(45) Date of Patent: Aug. 24, 2021

(54) SELF-SEALING FASTENER AND METHOD OF USE

(71) Applicant: SR Systems, LLC, Tuscaloosa, AL (US)

(72) Inventors: Steve Zimmerman, Linden, AL (US); Scott Drummond, Tuscaloosa, AL (US); Van T. Walworth, Rockwood, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 736 days.

(21) Appl. No.: 15/842,090

(22) Filed: Dec. 14, 2017

(65) Prior Publication Data
US 2018/0172058 A1 Jun. 21, 2018

Related U.S. Application Data

(60) Provisional application No. 62/434,527, filed on Dec. 15, 2016.

(51) Int. Cl.
*F16B 15/00* (2006.01)
*F16B 39/282* (2006.01)
(Continued)

(52) U.S. Cl.
CPC ............ *F16B 39/282* (2013.01); *F16B 15/06* (2013.01); *F16B 33/004* (2013.01); *F16B 35/06* (2013.01);
(Continued)

(58) Field of Classification Search
CPC .............................. F16B 33/004; F16B 43/001
(Continued)

(56) References Cited

U.S. PATENT DOCUMENTS

| 667,555 A | * | 2/1901 | McGahan | B05D 3/0426 427/386 |
| 3,247,752 A | * | 4/1966 | Greenleaf | F16B 43/001 411/542 |

(Continued)

FOREIGN PATENT DOCUMENTS

| CA | 3031239 A1 | 6/2018 |
| EP | 0476158 A1 | 3/1992 |

(Continued)

OTHER PUBLICATIONS

International Search Report and Written Opinion of the International Searching Authority for PCT/US2017/066756, dated Mar. 19, 2018.

(Continued)

*Primary Examiner* — Gary W Estremsky
(74) *Attorney, Agent, or Firm* — Schwegman Lundberg & Woessner, P.A.

(57) ABSTRACT

A self-sealing fastener for reducing leaks between the self-sealing fastener and a substrate. The self-sealing fastener includes a shank that extends longitudinally between a first end and a second end. The shank has an outer surface. The self-sealing fastener also includes a head that extends radially outwardly from the first end of the shank. The head has an underside surface that is adjacent to the first end of the shank and a topside surface opposite the underside surface. A mastic sealant is disposed on at least one of the outer surface of the shank and the underside surface of the head to provide a water-tight seal between the self-sealing fastener and the substrate after the self-sealing fastener is installed in the substrate.

26 Claims, 30 Drawing Sheets

(51) Int. Cl.
 *F16B 15/06*   (2006.01)
 *F16B 33/00*   (2006.01)
 *F16B 35/06*   (2006.01)
 *F16B 43/00*   (2006.01)
 *F16J 15/12*   (2006.01)
 *F16B 11/00*   (2006.01)
 *F16B 1/00*   (2006.01)
 *F16B 1/02*   (2006.01)

(52) U.S. Cl.
 CPC .......... *F16B 43/001* (2013.01); *F16J 15/122*
 (2013.01); *F16B 1/0071* (2013.01); *F16B 1/02*
 (2013.01); *F16B 11/006* (2013.01)

(58) Field of Classification Search
 USPC ............. 411/451.1, 82, 82.2, 82.3, 903, 908
 See application file for complete search history.

(56) References Cited

U.S. PATENT DOCUMENTS

| | | | | |
|---|---|---|---|---|
| 3,355,205 | A * | 11/1967 | Wagner | F16B 25/10 403/11 |
| 3,469,490 | A * | 9/1969 | Pearce, Jr. | F16B 43/001 411/371.1 |
| 3,639,137 | A * | 2/1972 | Marinelli | B21J 15/02 428/321.5 |
| 3,711,347 | A * | 1/1973 | Wagner | C09K 3/1018 156/91 |
| 3,897,713 | A * | 8/1975 | Gugle | F16B 5/0275 411/389 |
| 4,490,083 | A | 12/1984 | Rebish | |
| 5,193,958 | A * | 3/1993 | Day | B05D 5/08 411/82 |
| 5,260,100 | A * | 11/1993 | Day | B05D 3/0426 427/386 |
| 5,262,197 | A * | 11/1993 | Pollizzi | B05D 1/12 427/195 |
| 5,304,023 | A * | 4/1994 | Toback | F16B 33/004 411/387.3 |
| 5,452,977 | A * | 9/1995 | Terrizzi | F16B 33/004 411/82.5 |
| 5,463,800 | A | 11/1995 | Rojdev | |
| 7,527,463 | B2 * | 5/2009 | Wang | F16B 37/048 411/174 |
| 8,092,128 | B1 * | 1/2012 | Bray | F16B 19/008 411/82 |
| 8,920,088 | B1 * | 12/2014 | Garvin | F16B 15/0092 411/442 |
| 9,068,583 | B2 * | 6/2015 | Bray | B05D 3/06 |
| 2009/0184516 | A1 | 7/2009 | Schneider et al. | |
| 2011/0305540 | A1 | 12/2011 | Litzinger | |

FOREIGN PATENT DOCUMENTS

| | | |
|---|---|---|
| EP | 3555489 A1 | 10/2019 |
| GB | 2147678 A | 5/1985 |
| JP | S62-96110 U | 6/1987 |
| JP | H03-061707 | 3/1991 |
| JP | H07-14211 | 3/1995 |
| JP | 2001140826 A | 5/2001 |
| JP | 2020502439 A | 1/2020 |
| WO | WO-2018112384 A1 | 6/2018 |

OTHER PUBLICATIONS

"European Application Serial No. 17880734.3, Extended European Search Report dated Apr. 17, 2020", 7 pgs.

"European Application Serial No. 17880734.3, Response filed Jan. 13, 2020 to Communication pursuant to Rules 161(2) and 162 EPC dated Jul. 23, 2019", 4 pgs.

"International Application Serial No. PCT/US2017/066756, International Preliminary Report on Patentability dated Jun. 27, 2019", 10 pgs.

\* cited by examiner

SELF-SEALING FASTENER AND METHOD OF USE

CROSS REFERENCE TO RELATED APPLICATION

This application claims the benefit of U.S. Provisional Application No. 62/434,527, filed on Dec. 15, 2016. The entire disclosure of the application referenced above is incorporated herein by reference.

FIELD

The present disclosure generally relates to fasteners such as nails, screws, and bolts and more specifically to self-sealing fasteners and methods for installing self-sealing fasteners.

BACKGROUND

This section provides background information related to the present disclosure which is not necessarily prior art.

In the construction industry, wood is often secured and held together using fasteners such as nails, screws, and bolts. For example, nails, screws, and bolts are typically used in roofing construction and wood frame buildings. The purpose of the fastener is to penetrate a first wood substrate and enter a second wood substrate to hold the first wood substrate to the second wood substrate. The penetration of the fastener into and through the first and second wood substrates creates a potential leak point for water.

Over time, the wood substrates will be exposed to environmental conditions, which result in changes to the fibers of the wood substrate. Long-term environmental exposure to freeze and thaw and heat and cold dries out the wood fibers such that the wood effectively contracts away from the fasteners holding the substrates together. Repeated thermal variation cycles of environmental exposure also decreases the strength of wood substrates. In addition, exposure to wind, storms, and even the settling of the wood construction itself can reduce the fastener's ability to maintain secure attachment between the wood substrates.

For these reasons, fasteners of wood substrates often become loose over time and are easily dislodged during weather events such as hurricanes and/or tornadic storms. If the fasteners completely lose their ability to maintain secure attachment between wood substrates, then failure of the structure can occur. However, even if the fasteners manage to maintain a secure attachment between wood substrates during a weather event, leaks can occur because weather events often include rain along with wind. The wind often removes coverings such as shingles, felt roll layers, and siding. Once these outer coverings are removed by the wind, the head of the fastener becomes directly exposed to environmental elements and conditions. Due to the contraction of the wood substrate over time, water leakage can seep under the head of the fastener and down the shank of the fastener and into the structure causing damage.

Fasteners are the first line of defense for wood framed structures. However, the main structure of a building is often framed with more of an emphasis on speed than on quality because framing contractors almost always frame by price per square foot. Because of this, the faster contractors frame, the more money they make. Thus, the primary frame of the structure is often subject to inferior construction techniques due to a hurried pace of construction. For example, in many instances, fasteners are improperly installed where the tip of the fastener and/or a portion of the shank of the fastener is exposed and extends out of the second wood substrate. The exposed tip and/or shank of the fastener is a potential problem on many levels. The exposed tip and/or shank of the fastener may be due to an errant location of the fastener by the installer. The exposed tip and/or shank of the fastener can be caused by the fastener traveling off line during installation due to the grain of the wood substrate. The exposed tip and/or shank of the fastener can also be from the use of a fastener that was excessively long to start with. Regardless of the reason, the potential for leaks increases when the tip and/or shank of the fastener is left exposed. If structures are to be improved during the building process, there needs to be improvements in materials and fasteners to compensate for the hurried pace of construction at the expense of proper fastener application techniques.

SUMMARY

This section provides a general summary of the disclosure and is not a comprehensive disclosure of its full scope or all of its features.

In accordance with one aspect of the subject disclosure, a self-sealing fastener is provided to reduce leaks between the fastener and a substrate. The self-sealing fastener includes a shank that extends longitudinally between a first end and a second end. The shank has an outer surface. The self-sealing fastener also includes a head that extends radially outwardly from the first end of the shank. The head has an underside surface that is adjacent to the first end of the shank and a topside surface opposite the underside surface. A mastic sealant is disposed on at least one of the outer surface of the shank and the underside surface of the head.

In accordance with another aspect of the subject disclosure, the head of the self-sealing fastener extends radially outwardly from the first end of the shank to an outer rim. The underside surface of the head includes a concave surface defined by an annular trough and a flat radial surface positioned radially between the concave surface and the outer rim. The mastic sealant is disposed on the outer surface of the shank adjacent to the first end at a first thickness. The mastic sealant is disposed on the concave surface of the underside surface of the head at a second thickness. Finally, the mastic sealant is disposed on the flat radial surface of the underside surface of the head at a third thickness. The first, second, and third thicknesses of the mastic sealant may be different or equal to one another depending upon the application. Advantageously, the mastic sealant provides a watertight seal between the self-sealing fastener and the substrate after the self-sealing fastener is installed in the substrate.

In accordance with another aspect of the subject disclosure, a method of installing the self-sealing fastener is provided. The method includes the steps of: applying a first layer of mastic sealant to at least one of the shank and the underside surface of the head and applying a second layer of mastic sealant over the first layer of mastic sealant before the first layer of mastic sealant is fully cured. As a result of this step, the second layer of mastic sealant forms a protective skin over the first layer of mastic sealant. The method also includes the step of forcing the shank of the self-sealing fastener into the substrate such that the second layer of mastic sealant ruptures as the second layer of mastic sealant makes contact with the substrate. As a result of this step, the first layer of mastic sealant flows between the self-sealing fastener and the substrate to form a water-tight seal between the self-sealing fastener and the substrate.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
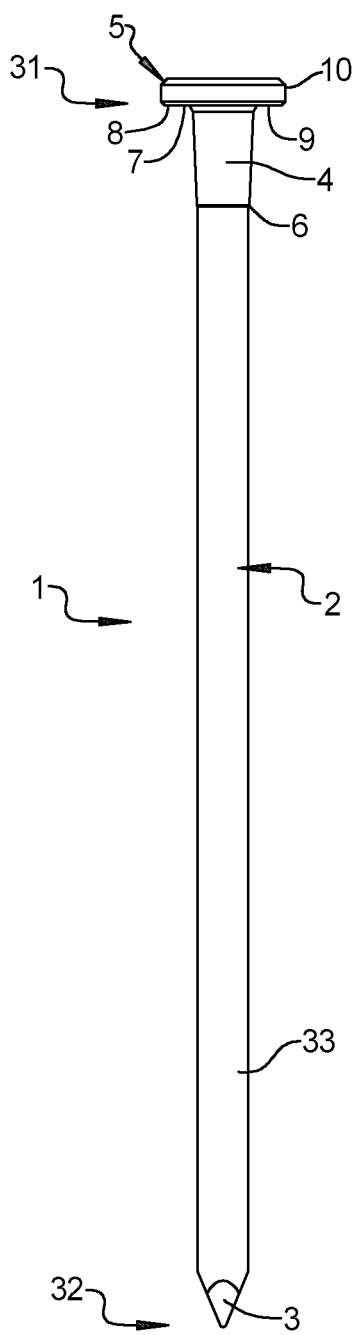
FIG. 1 is a side elevation view of an exemplary fastener constructed in accordance with the subject disclosure where the fastener includes a head and a smooth shank with a conical buttress.

Referring to the Figures, wherein like numerals indicate corresponding parts throughout the several views, a self-sealing fastener 1 is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
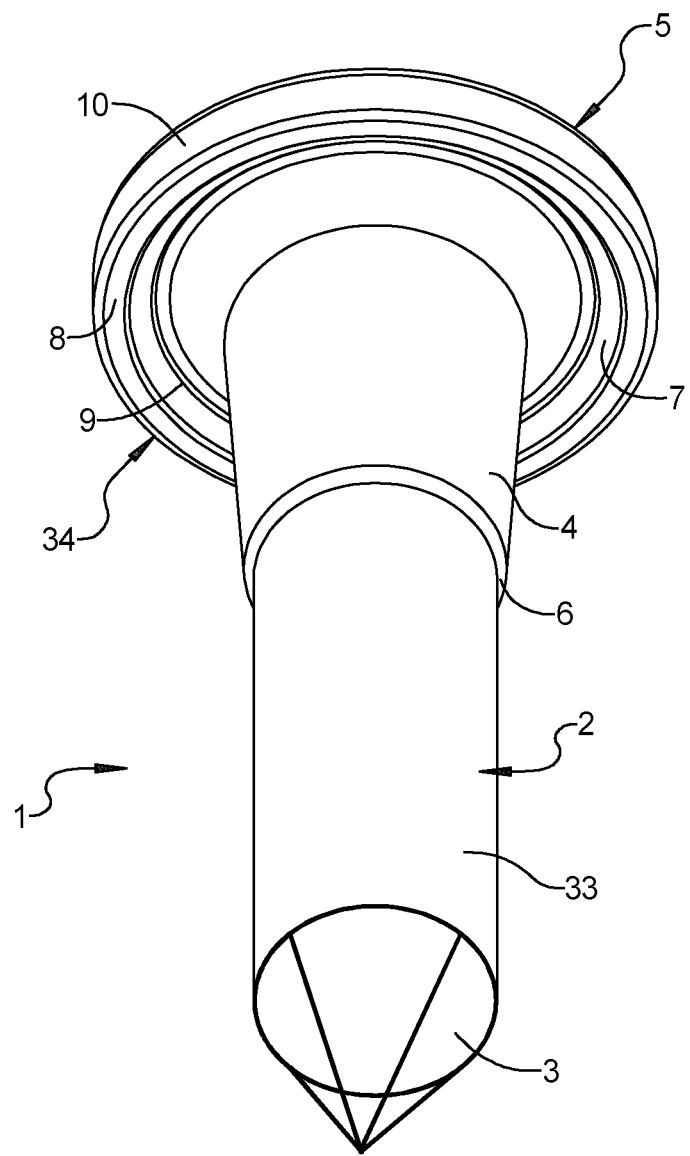
FIG. 2 is a bottom perspective view of the exemplary fastener illustrated in FIG. 1.
Figure 3:
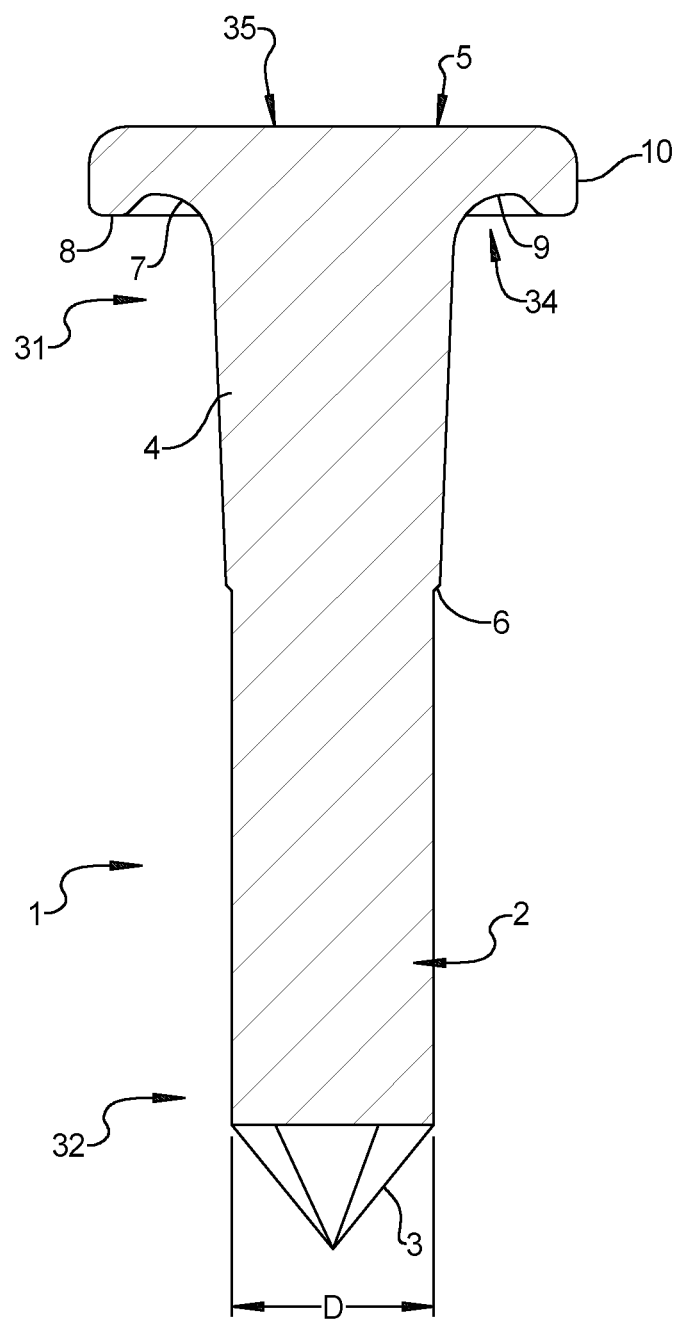
FIG. 3 is a side cross-sectional view of the exemplary fastener illustrated in FIG. 1.

Referring to FIGS. 1-3, an exemplary fastener 1 is shown comprised of a shank 2 and a head 5. The shank 2 is juxtaposed between a conical buttress 4 and a point 3. The shank 2 extends longitudinally between a first end 31 and a second end 32. The conical buttress 4 is located and the first end 31 of the shank 2 and the point 3 is located at the second end 32 of the shank 2. The shank 2 has an outer surface 33, which is smooth and cylindrically shaped in the illustrated embodiment shown in FIGS. 1-3. The head 5 extends radially outwardly from the first end 31 of the shank 2 to an outer rim 10. The head 5 has an underside surface 34 that is adjacent to the first end 31 of the shank 2. The head 5 also includes a topside surface 35 opposite the underside surface 34. The underside surface 34 of the head 5 has a concave surface 7 that is defined by a trough 9 that extends annularly about the first end 31 of the shank 2. The underside surface 34 of the head 5 also has a flat radial surface 8 that is positioned radially between the concave surface 7 and the outer rim 10. The trough 9 on the underside surface 34 of the head 5 extends radially from the conical buttress 4 to the flat radial surface 8. The flat radial surface 8 is oriented relatively transverse to the shank 2 and is provided toward the outer rim 10 of the head 5. Outer rim 10 is relatively parallel to the shank 2. There is a transition point 6 where the conical buttress 4 meets the outer surface 33 of the shank 2. The transition point 6 can be a radius, chamfer, or similar shape between the outer surface 33 of the shank 2 and the conical buttress 4. The shank 2 has a shank diameter D. The shank diameter D progressively increases along the conical buttress 4 moving from the transition point 6 to the underside surface 34 of the head 5.

The fastener 1 may be fabricated by drawing wire down to a selected feed stock wire diameter. Once a desired feed stock wire diameter is achieved, the wire feed stock is fed into a header machine that clamps the wire in a die where a forming operation occurs. The primary forming operation may include, but is not limited to, cutting the wire feed stock to a specific length according to the application requirements. The primary forming operation may also include shaping the point 3 on the second end 32 of the fastener 1. The primary forming operation may also include shaping the head 5 on the first end 31 of the fastener 1.

The primary forming operations previously listed may or may not happen simultaneously. Some operations may require a multi-step forming process. Usually the complexity of the shape and/or the size of the fastener 1 will dictate how many primary forming operations are required. After the primary forming operations are complete, additional secondary forming operations may be required. Some of the types of secondary forming operations include, but are not limited to, forming ring-like structures on the outer surface 33 of the shank 2, forming a break-a-way groove on the shank 2, forming thread-like structures on the outer surface 33 of the shank 2, applying adhesive to the fastener 1, adding specialized markings/identifications to the fastener 1, and collating fasteners 1 into coils and/or sticks.

Figure 4:
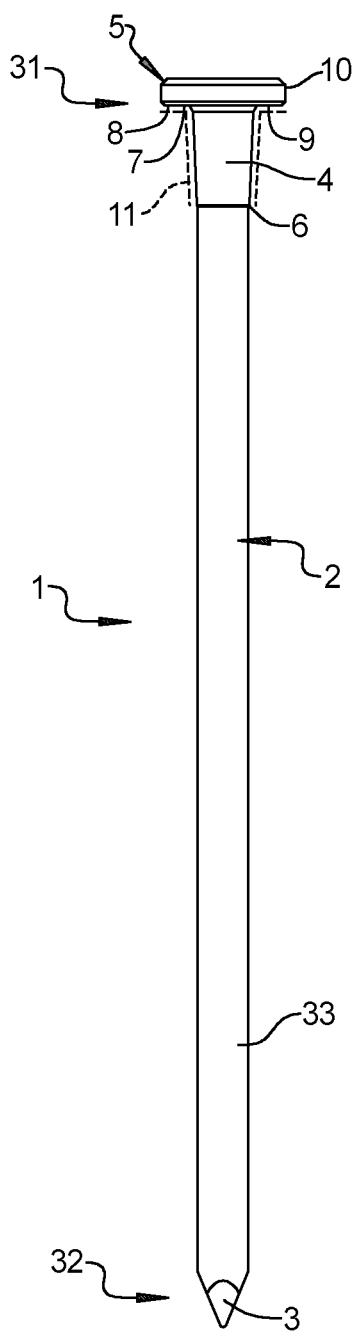
FIG. 4 is a side elevation view of the exemplary fastener illustrated in FIG. 1 where a mastic sealant has been applied to the conical buttress of the shank and an underside surface of the head.
Figure 5:
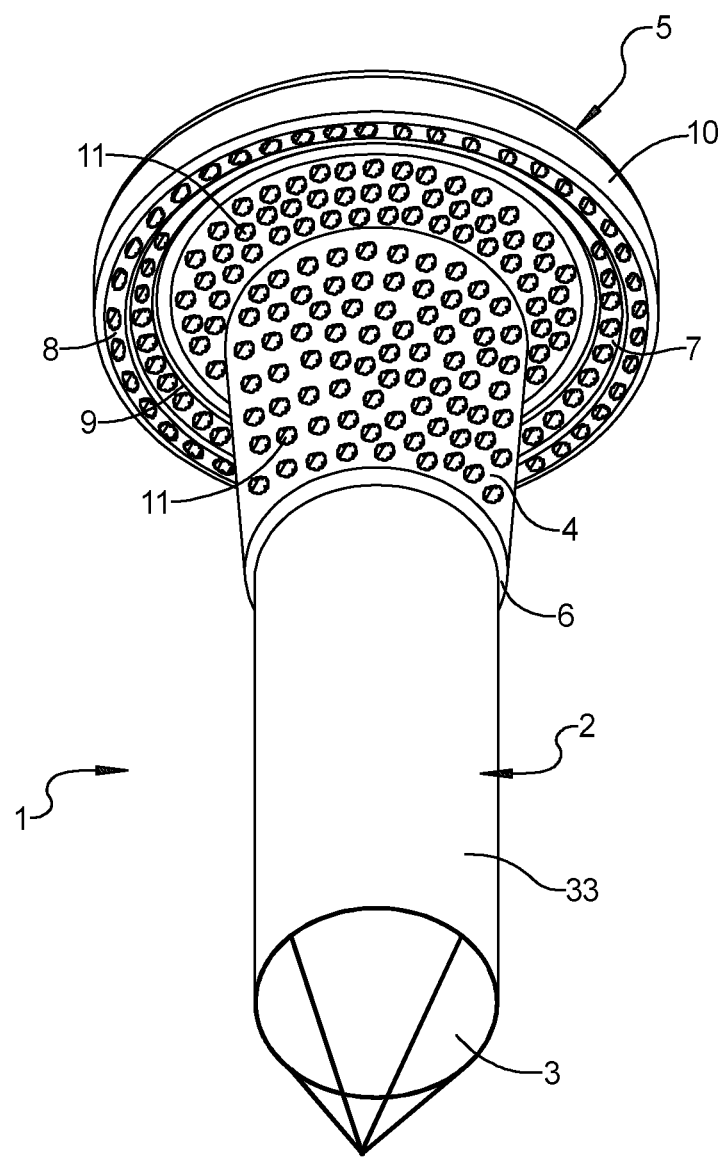
FIG. 5 is a bottom perspective view of the exemplary fastener illustrated in FIG. 4.
Figure 6:
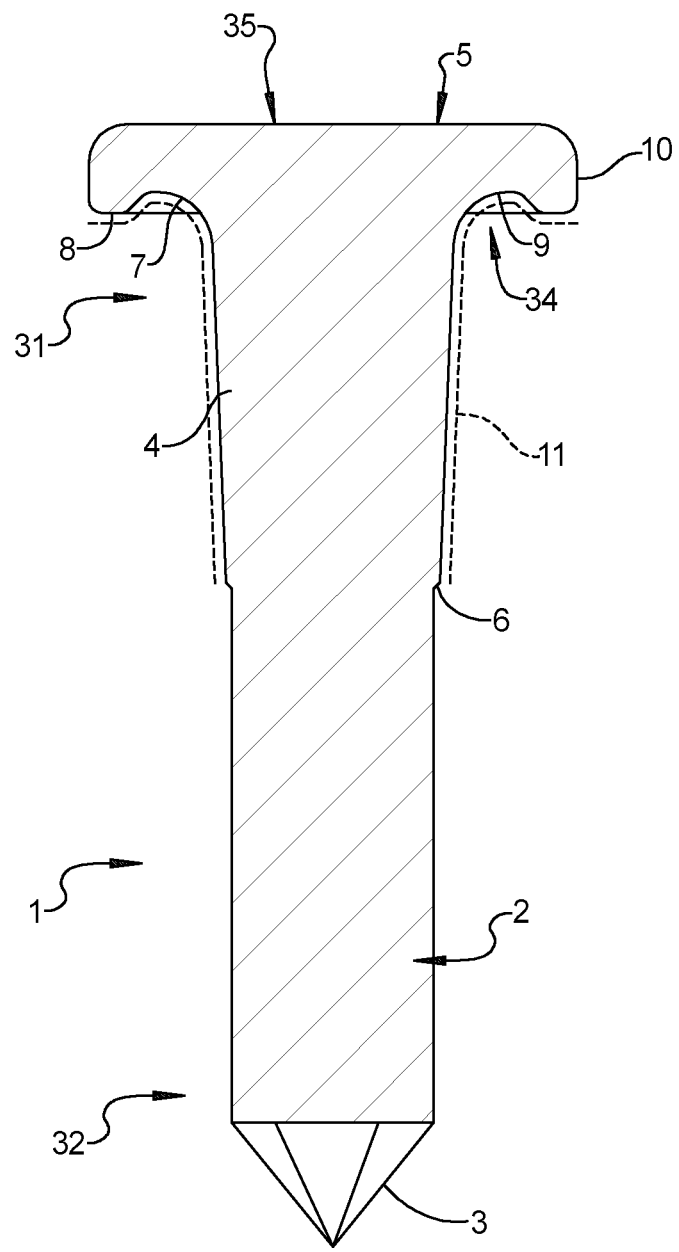
FIG. 6 is a side cross-sectional view of the exemplary fastener illustrated in FIG. 4.

Referring to FIGS. 4-6, a mastic sealant 11 is disposed on the outer surface of the shank and the underside surface of the head. More specifically, the mastic sealant 11 is applied to the conical buttress 4 of the shank 2, the concave surface 7 of the head 5, and the flat radial surface 8 of the head 5. The mastic sealant 11 provides a water-tight seal after installation of the self-sealing fastener 1. Little or no mastic sealant 11 is applied past the transition point 6 on the shank 2. The mastic sealant 11 is shown in FIG. 4 as dotted lines. However, it should be appreciated that in this preferred embodiment, the mastic sealant 11 covers the entire circumference of the portions and surfaces of the fastener 1 adjacent the dotted lines. This representation will be consistent throughout the figures of this disclosure. Similarly, portions and surfaces of the fastener 1 shown in FIG. 5 appear to be covered with mastic sealant 11 that is depicted as being scattered, splotchy, or applied as a pattern of dots.

Although the mastic sealant 11 could be applied as in pattern of dots, lines, or other shapes, the mastic sealant 11 in the preferred embodiment is applied to cover the entire portions and surfaces of the fastener 1 where the pattern fill is depicted. This representation will be consistent throughout the figures of this disclosure.

As will be explained below, exemplary embodiments include applying the mastic sealant 11 to the underside surface 34 of the head 5, to various portions of the shank 2, and/or to the point 3 of the fastener 1. The mastic sealant 11 can also be applied to fasteners 1, which also may feature additional adhesive coatings.

Figure 7:
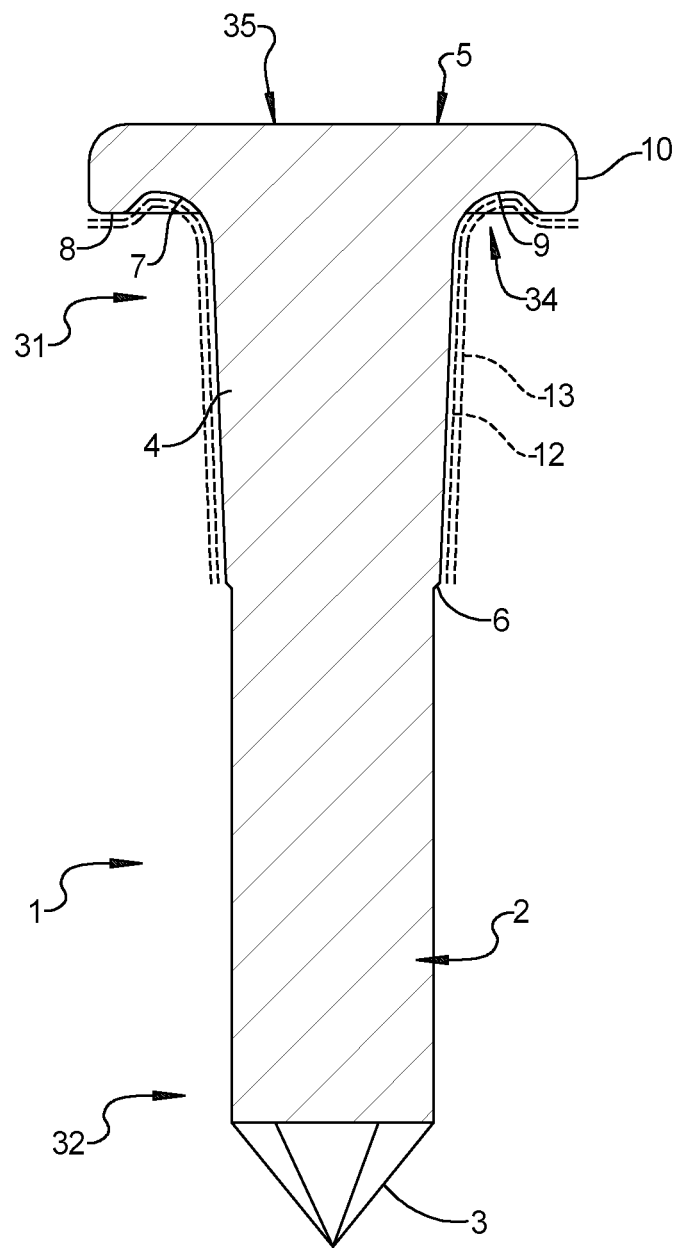
FIG. 7 is a side cross-sectional view of the exemplary fastener illustrated in FIG. 1 where two layers of mastic sealant have been applied to the conical buttress of the shank and the underside surface of the head.
Figure 8:
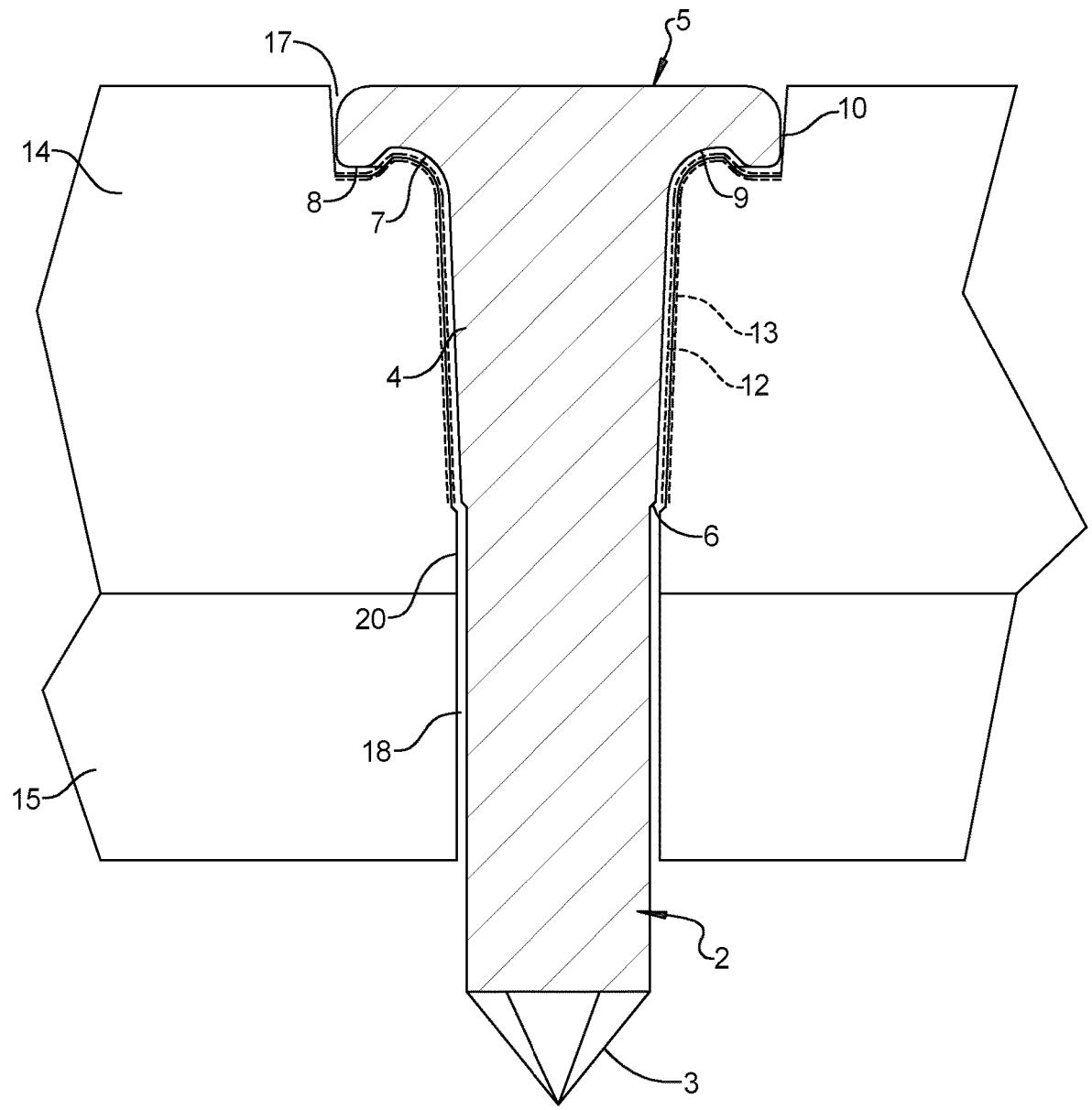
FIG. 8 is a side cross-sectional view of the exemplary fastener illustrated in FIG. 7 where the fastener is shown extending through first and second substrates.

Referring to FIGS. 7 and 8, the mastic sealant 11 is applied in a first sealant layer 12 and the second sealant layer 13. The first sealant layer 12 is applied to the underside surface 34 of the head 5 and to the conical buttress 4. After an appropriate drying time, the second sealant layer 13 is applied over the first sealant layer 12. The drying time of the mastic sealant 11 will vary according to the formulation of the mastic sealant 11. By way of example and without limitation, an appropriate drying time for the second sealant layer 13 may be as short as one hour and as long as twenty-four hours. Therefore, some mastic sealants 11 dry in a shorter time than other mastic sealants 11. The first sealant layer 12 will need a certain amount of drying time before the second sealant layer 13 is applied. However, the first sealant layer 12 need not be fully dried before the second sealant layer 13 is applied. The first sealant layer 12 needs to only partially cure before the second sealant layer 13 is applied because the second sealant layer 13 will provide a protective skin over the first sealant layer 12, preventing the mastic sealant 11 in the first sealant layer 12 from completely drying or curing. A preferred partial curing time for the first sealant layer 12 is 5 to 40 percent of the time required to fully dry and cure the mastic sealant 11. The mastic sealant 11 in the first sealant layer 12 may develop a thin skin cure in as little as 5-10 minutes, at which point the second sealant layer 13 can be applied. The second sealant layer 13 will therefore be fully dried and cured while the first sealant layer 12 remains partially cured until the fastener 1 is installed in the substrate 14. The second sealant layer 13 is exposed to atmosphere and/or to low-level curing methods. As a result, the first sealant layer 12 is disposed on the concave surface 7 of the head 5, the flat radial surface 8 of the head 5, and the conical buttress 4 of the shank 2. The second sealant layer 13 is applied to the same surfaces as the first sealant layer 12, essentially covering the first sealant layer 12.

The first sealant layer 12 and the second sealant layer 13 are shown in FIG. 7 as dotted lines. However, the first and second sealant layers 12, 13 cover the entire circumference of the portions and surfaces of the fastener 1 adjacent to the dotted lines. This representation will be consistent throughout the figures of this disclosure. The second sealant layer 13 shields and protects the first sealant layer 12 from exposure to atmosphere and/or environmental conditions which would otherwise continue to cure the first sealant layer 12. The length of time between application of the first sealant layer 12 and the second sealant layer 13 is relatively short in a controlled manufacturing facility and production line system. However, the length of time between when the completed fastener 1 with the first and second sealant layers 12, 13 is shipped to end users and when the fastener 1 is installed is a relatively long time. Therefore, the second sealant layer 13 ensures that the mastic sealant 11 in the first sealant layer 12 remains resilient and pliable during the relatively lengthy period between fabrication and installation. Prior to installing the fastener 1 into one or more substrates 14, 15, the "cure state" and "viscosity" of the mastic sealant 11 in the second sealant layer 13 is greater than the "cure state" and "viscosity" of the mastic sealant 11 in the first sealant layer 12. In other words, the mastic sealant 11 in the first sealant layer 12 has a relatively lower viscosity and/or cure state, while the mastic sealant 11 in the second sealant layer 13 has a relatively higher state of cure and/or a relatively higher viscosity. For example, and without limitation, the mastic sealant 11 may be silicone based. The viscosity of silicone based mastic sealants 11 varies with the level of polymerization. The greater the level of polymerization of the mastic sealant 11, the higher the molecular weight of the mastic sealant 11. The higher the molecular weight of the mastic sealant 11, the longer the polymer chain. The longer the polymer chain, the higher the relatively viscosity of the mastic sealant 11. The higher the relative viscosity of the mastic sealant 11, the more slowly the mastic sealant 11 will flow. The viscosity of mastic sealants may vary from highly fluid mastic sealants with a viscosity of 0.65 centistokes (which is thinner than water) to very thick mastic sealants with a viscosity of more than 20,000,000 centistokes (which is thicker than chewing gum). By way of example and without limitation, the first sealant layer 12 may have a viscosity in the range of 10 to 200 centistokes while the second sealant layer 13 may have a viscosity in the range of 200 to 20,000,000 centistokes. While the specific range of viscosity for the first sealant layer 12 and the second sealant layer 13 may vary, it is important for the relative viscosity of the first sealant layer 12 to be is less than the relative viscosity of the second sealant layer 13.

The second sealant layer 13 may be applied as a thin layer, which may have a thickness that equals 25 to 50 percent of the thickness of the first sealant layer 12. As a result, the second sealant layer 13 forms a thin protective skin over the lesser cured mastic sealant 11 in the first sealant layer 12, which is underneath the second sealant layer 13 and next to the fastener 1. As shown in FIG. 8, when the fastener 1 is installed into substrates 14, 15, the thin skin of the second sealant layer 13 ruptures, allowing the lesser cured mastic sealant 11 in the first sealant layer 12 to flow into gap 18 and against the substrate 14 forming both a bond and a flexible seal.

A method of installing the self-sealing fastener 1 shown in FIGS. 7 and 8 will now be described. The method includes the step of applying a first layer 12 of mastic sealant 11 to at least one of the shank 2 of the self-sealing fastener 1 and the underside surface 34 of the head 5 of the self-sealing fastener 1. The method continues with the step of applying a second layer 13 of mastic sealant 11 over the first layer 12 of mastic sealant 11 before the first layer 12 of mastic sealant 11 is fully cured such that the second layer 13 of mastic sealant 11 forms a protective skin over the first layer 12 of mastic sealant 11. The method then continues with the step of forcing the shank 2 of the self-sealing fastener 1 into the substrate 14 such that the second layer 13 of mastic sealant 11 ruptures as the second layer 13 of mastic sealant 11 makes contact with the substrate 14. As a result of the second layer 13 of mastic sealant 11 rupturing, the first layer 12 of mastic sealant 11 is allowed to flow between the self-sealing fastener 1 and the substrate 14 and form a water-tight seal.

Figure 9:
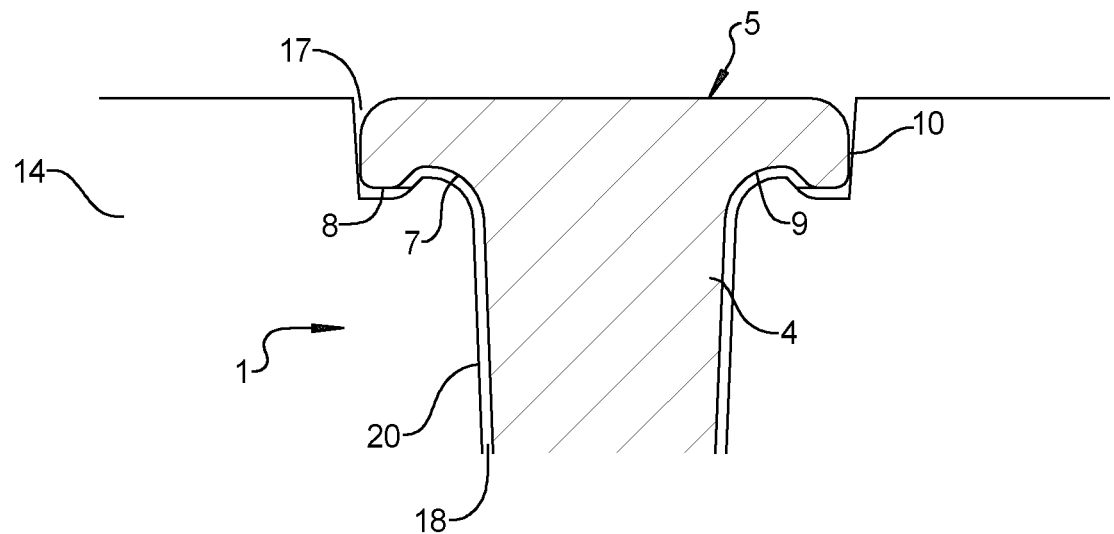
FIG. 9 is a partial, side cross-sectional view of the exemplary fastener illustrated in FIG. 1 where the fastener is shown installed in the first substrate.
Figure 10:
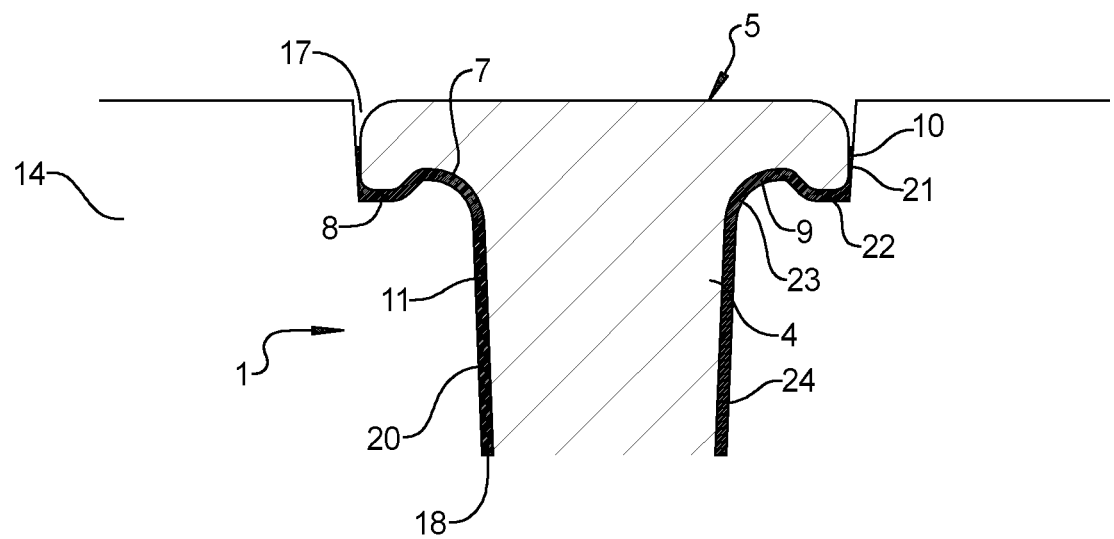
FIG. 10 is a partial, side cross-sectional view of the exemplary fastener illustrated in FIG. 4 where the fastener is shown installed in the first substrate.
Figure 11:
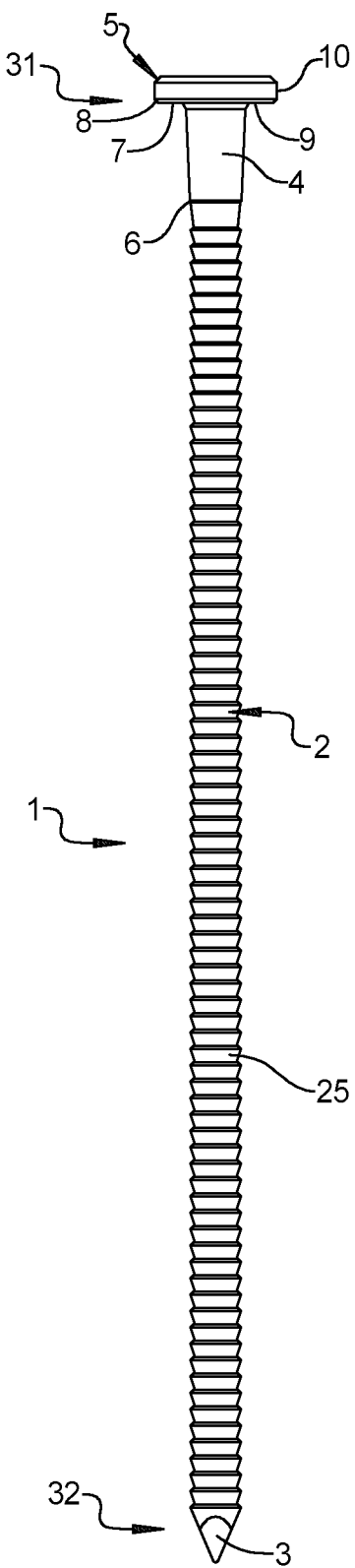
FIG. 11 is a side elevation view of another exemplary fastener constructed in accordance with the subject disclosure where the fastener includes a head and a shank with ring-shaped projections and a conical buttress.
Figure 12:
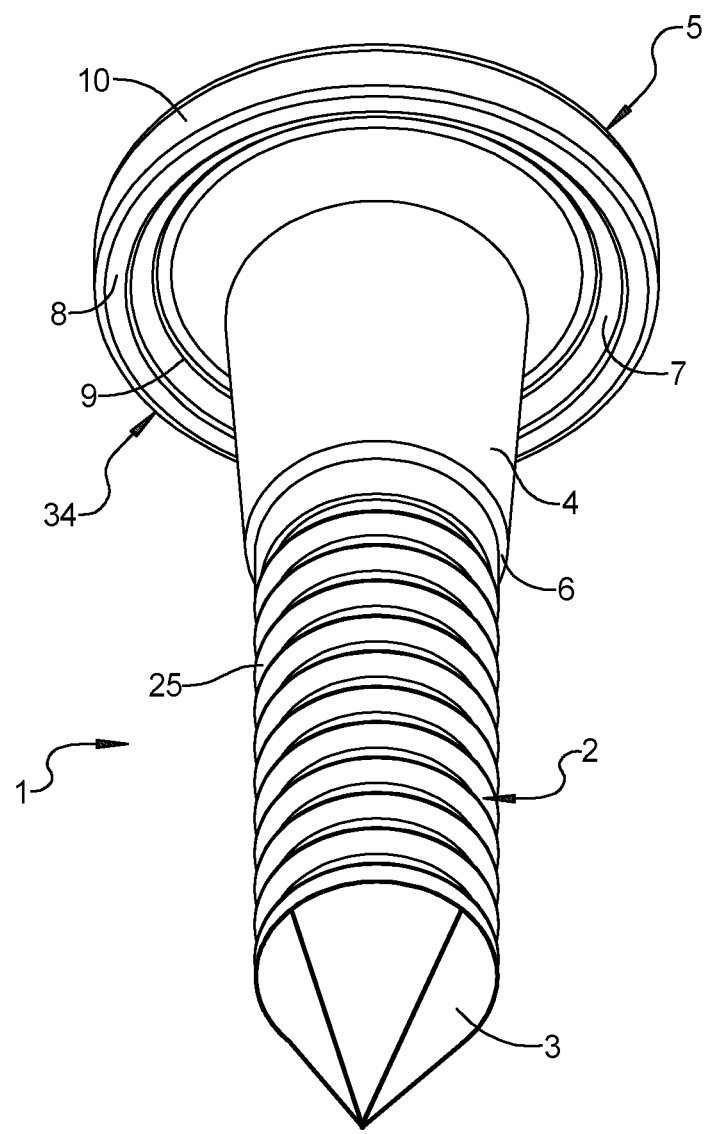
FIG. 12 is a bottom perspective view of the exemplary fastener illustrated in FIG. 11.

Referring to FIGS. 9 and 10, the fastener 1 is shown installed in a substrate 14. Over time, the substrate 14 is exposed to environmental conditions which result in changes to the wood fibers of the substrate 14. The long term environmental exposure to freeze and thaw and heat and cold cycles dries out the wood fibers such that the substrate 14 effectively contracts away from the fastener 1, creating a gap 18. As a result, surface 20 of the substrate 14 will not be in intimate contact with the conical buttress 4 of the fastener 1.

Like most all materials, wood has a characteristic property of thermal conductivity. The thermal conductivity of wood is relatively low because the innate porosity of wood is relatively high. Therefore, the thermal conductivity of wood decreases proportionally as the density of the wood decreases. Thermal conductivity of wood increases proportionally as moisture in the wood increases. These relationships also mean that as the temperature of a wood decreases, due to the environmental conditions to which it is exposed, the strength of the wood will proportionally increase. Repeated thermal variation cycles of environmental exposure decrease the strength of wood in the substrate 14.

Thermal conductivity of materials can also be evaluated by the coefficient of thermal expansion for a given material. For example, the coefficient of thermal expansion for wood varies depending on the type of wood and varies with the wood grain orientation. The scope of this disclosure does not require a detailed differentiation of wood types or grain orientations. Therefore, the coefficient of thermal expansion for most substrates made of wood is approximately 0.0000028-0.0000030 inches per degree Fahrenheit. This means the entirety of the substrate 14 expands and contracts proportionally with environmental temperature changes according to this relationship.

In similar fashion, the fastener 1 also thermally expands and contracts in proportion to the same environmental conditions to which the substrate 14 is exposed. In the preferred embodiment, the fastener 1 is fabricated from steel. The coefficient of thermal expansion for steel varies depending upon the specific type and grade of steel. The scope of this disclosure does not require a detailed differentiation of steel types or grades. Therefore, the coefficient of thermal expansion for most steel is approximately 0.0000063-0.0000070 inches per degree Fahrenheit. This means the entirety of the fastener 1 expands and contracts proportionally with environmental temperature changes according to this relationship.

Most notable in comparing the coefficient of thermal expansion for the fastener 1 to that of the substrate 14 is that the fastener 1 expands almost twice as much per degree Fahrenheit as the substrate 14 when exposed to the same environmental conditions. Since the fastener 1 has a higher density and hardness than the substrate 14, the inside hole diameter surface 20 of the substrate 14 will be increased and effectively swedged beyond its initial size. When thermal environmental conditions reverse, the fastener 1 will contract in size at a rate twice that of the substrate 14. However, the relative inelastic nature of the substrate 14 means that the increased size of the swedged hole will remain predominately enlarged relative to the outer surface 33 of the shank 2 creating a gap 18 between the inside hole diameter surface 20 and the outer surface 33 of the shank 2. This difference in diameters between the shank 2 of the fastener 1 and the inside hole diameter surface 20 of the substrate 14 creates a potential leakage path for water ingress.

Similar loosening and/or leakage paths occur for the same reasons between the underside surface 34 of the head 5 of the fastener 1 and the substrate 14. As the head 5 of the fastener 1 is embedded relatively flush into the substrate 14, a depression 17 is formed and there is an initial intimate surface contact between the head 5 of the fastener 1 and the substrate 14. However, over time, the coefficient of thermal expansion differences between the fastener 1 and the substrate 14 result in a less intimate surface contact, which allows an opportunity for water leakage between the underside surface 34 of the head 5 of the fastener 1 and the substrate 14. For these reasons, the fastener 1 may become loose over time and may become easily dislodged from the substrate 14 during weather events such as hurricanes and/or tornadic storms. If the fastener 1 completely loses its ability to maintain a secure position in the substrate, then the holding power of the fastener 1 is compromised.

Even if the fastener 1 maintains a secure position in substrate 14 during a weather event, weather events often include much rain along with the wind effects. The wind effects often remove coverings such as shingles, felt roll layers, siding, and the like. Once these outer coverings are removed by wind, the head 5 of the fastener 1 becomes directly exposed to environmental elements and conditions. Due to the contraction of the substrate 14, water leakage can seep under the head 5 of the fastener 1 and down the shank 2 of the fastener 1. This water leakage can cause damage to the substrate 14 and surrounding structures.

For example, fasteners 1 used to hold roof sheathing are notorious for moving upward over time. Heat dries the sheathing and loosens the fasteners 1. This is a well-known concern. The head 5 of the fasteners 1 allow water to "seep" in and leaks occur. If not detected, sheathing deteriorates, insulation molds and sheet rock is damaged. In colder seasons, the environmental conditions will promote this water to freeze resulting in deterioration and splitting of the substrate 14. In addition, the fasteners 1 can rust.

As shown in FIG. 10, mastic sealant 11 forms an initial water tight seal between the fastener 1 and the substrate 14, which prevents water leakage between the fastener 1 and the substrate 14. More specifically, the mastic sealant 11 flows into and fills gap portions 21, 22, 23, and 24 during installation of the fastener 1 into the substrate 14. As the substrate 14 contracts and shrinks over time, the mastic sealant 11 maintains a seal in the gap 18.

As wood contraction takes place over time, the fastener 1 is effectively in a looser position relative to the substrate 14 because of the expansion and contraction of the fastener 1 and the substrate 14. The slightly looser condition allows the substrate 14 and the fastener 1 to move relative each other in very small increments. These small increments of relative movement are caused by environmental thermal expansion of the wood of the substrate 14 relative to the thermal expansion of the steel in the fastener 1. This thermal expansion difference is reversed as the structure is exposed to cold conditions. However, the mastic sealant 11 remains resilient over time. As the incremental relative movements of the fastener 1 and the substrate 14 occur, the mastic sealant 11 maintains the water tight seal between the fastener 1 and the substrate 14. In other words, when the relative position of the fastener 1 and the substrate 14 are at rest and not moving, the water tight seal provided by the mastic sealant 11 is relatively static. However, when there is relative incremental movement between the fastener 1 and the substrate 14, the water tight seal provided by the mastic sealant 11 between the fastener 1 and the substrate 14 is relatively dynamic. The water tight seal is maintained during such relative incremental movements between the fastener 1 and the substrate 14 due to the flexibility of the mastic sealant 11. It should be appreciated that while the above discussion focuses on a substrate 14 made of wood and a fastener 1 made of steel, these materials are provided as examples and are not intended as limiting.

In addition to sealing potential leak paths between the fastener 1 and the substrate 14, the mastic sealant 11 also provides other benefits. For example, the self-sealing fastener 1 has improved seismic/vibration resistance over conventional fasteners because the mastic sealant 11 bonds to the substrate 14. Additionally, the portions and surfaces of the fastener 1 that are coated with the mastic sealant 11 are protected from the environment (e.g., moisture) and are therefore less prone to rust, which extends the life of the fastener 1 beyond that of conventional fasteners.

The mastic sealant 11 may be applied to the various portions and surfaces of the fastener 1 with a uniform thickness. Alternatively, the mastic sealant 11 may be applied at a greater thickness on some surfaces and at a lesser thickness on other surfaces of the fastener 1. With reference to FIGS. 4-6 and 10, the mastic sealant 11 may be applied to the conical buttress 4 at a first thickness, to the concave surface 7 at a second thickness, and to the flat radial surface 8 at a third thickness. In some industry specific applications, such as general-purpose fasteners, the mastic sealant 11 is applied relatively uniform where the first thickness of the mastic sealant 11 applied to the conical buttress 4 equals the second thickness of the mastic sealant 11 applied to the concave surface 7 and the second thickness of the mastic sealant 11 applied to the concave surface 7 equals the third thickness of the mastic sealant 11 applied to the flat radial surface 8. The following expression set forth in Equation A below recites the comparative thickness of the mastic sealant 11 on surfaces 4, 7, and 8 using this application scenario:

Surface 4=Surface 7=Surface 8    Equation A:

In other industry specific applications, such as exposed construction with known water exposure, the mastic sealant 11 is applied deliberately thicker on some surfaces compared to other surfaces. For example, the mastic sealant 11 may be applied where the second thickness of the mastic sealant 11 applied to the concave surface 7 is greater than the third thickness of the mastic sealant 11 applied to the flat radial surface 8 and the third thickness of the mastic sealant 11 applied to the flat radial surface 8 is greater than the first thickness of the mastic sealant 11 applied to the conical buttress 4. The following expression set forth in Equation B below recites the comparative thickness of the mastic sealant 11 on surfaces 4, 7, and 8 using this application scenario:

Surface 7>Surface 8>Surface 4    Equation B:

In still other industry specific applications, such as installations where the substrate 14 may contract or shrink excessively due to extreme environmental heat exposure, creating a contraction gap 18, it may be desirable to have excess mastic sealant 11 applied on the conical buttress 4 so that as the fastener 1 is installed into the substrate 14, a wiping action forces the excess mastic sealant 11 upward toward the underside surface 34 of the head 5 ensuring greater coverage on the substrate surface 20 adjacent to the conical buttress 4. For example, the mastic sealant 11 may be applied where the first thickness of the mastic sealant 11 applied to the conical buttress 4 is greater than the second thickness of the mastic sealant 11 applied to the concave surface 7 and the second thickness of the mastic sealant 11 applied to the concave surface 7 is equal to the third thickness of the mastic sealant 11 applied to the flat radial surface 8. The following expression set forth in Equation C below recites the comparative thickness of the mastic sealant 11 on surfaces 4, 7, and 8 using this application scenario:

Surface 7=Surface 8<Surface 4    Equation C:

As shown by Equations A-C, the fastener 1 may have any one of multiple variations of applied film thickness of the mastic sealant 11 provided to meet industry specific requirements. All variations of applied film thickness may be provided using the same mastic sealant 11 and the same application methods. Alternatively, different mastic sealants 11 and/or different application methods may be used for the different surfaces of the fastener 1.

Application methods for applying the mastic sealant 11 include, but are not limited to dipping, masking certain portions of the fastener 1 to prevent application, brushing, spraying, electrostatic spraying, transferring, silk screen, and other similar methods and techniques. Notwithstanding these examples, it should be appreciated that the scope of this disclosure does not depend upon the method used to apply the mastic sealant 11.

The mastic sealant 11 may be any one of several readily available mastic sealants and/or mastic-like products, such as silicone based sealants, elastomer based sealants, coal tar and/or petroleum byproduct sealants, caulk-like sealants, epoxy sealants, and other similar products which retain a relatively resilient characteristic over time.

Referring again to FIGS. 7 and 8, in some industry specific applications, such as general-purpose fasteners, the first sealant layer 12 may be applied to the fastener 1 at a relatively uniform thickness across the conical buttress 4, the concave surface 7, and the flat radial surface 8 of the fastener 1. The following expression set forth in Equation D below recites the comparative thickness of the first sealant layer 12 on surfaces 4, 7, and 8 using this application scenario:

Surface 4=Surface 7=Surface 8    Equation D for the first sealant layer 12:

In other industry specific applications, such as exposed construction with known water exposure, the first sealant layer 12 may be applied where the mastic sealant 11 is deliberately thicker on some surfaces and thinner on other surfaces of the fastener 1. For example, the first sealant layer 12 may be applied where the mastic sealant 11 in the first sealant layer 12 is thicker on the concave surface 7 of the head 5 than it is on the flat radial surface 8 of the head 5 and where the mastic sealant 11 in the first sealant layer 12 on the flat radial surface 8 of the head 5 is thicker than it is on the conical buttress 4. The following expression set forth in Equation E below recites the comparative thickness of the first sealant layer 12 on surfaces 4, 7, and 8 using this application scenario:

Surface 7>Surface 8>Surface 4    Equation E for the first sealant layer 12:

In still other industry specific applications, such as installations where the substrate 14 may contract or shrink excessively due to extreme environmental heat exposure, creating a contraction gap 18, it may be desirable to have excess mastic sealant 11 in the first sealant layer 12 applied on the conical buttress 4 so that as fastener 1 is installed into the substrate 14, a wiping action forces excess mastic sealant 11 upward toward the underside surface 34 of the head 5. This ensures greater coverage of the mastic sealant 11 in the first sealant layer 12 on the conical buttress 4. For example, the thickness of the mastic sealant 11 in the first sealant layer 12 on the concave surface 7 and the flat radial surface 8 may be equal, but less than the thickness of the mastic sealant 11 in the first sealant layer 12 on the conical buttress 4. The following expression set forth in Equation F below recites the comparative thickness of the first sealant layer 12 on surfaces 4, 7, and 8 using this application scenario:

Surface 7=Surface 8<Surface 4    Equation F for the first sealant layer 12:

In some industry specific applications, such as general-purpose fasteners, the second sealant layer 13 may be applied to the fastener 1 at a relatively uniform thickness across the conical buttress 4, the concave surface 7, and the flat radial surface 8 of the fastener 1. The following expression set forth in Equation G below recites the comparative thickness of the second sealant layer 13 on surfaces 4, 7, and 8 using this application scenario:

Surface 4=Surface 7=
Surface 8        Equation G for the second sealant layer 13:

In other industry specific applications, such as exposed construction with known water exposure, the second sealant layer 13 may be applied where the mastic sealant 11 is deliberately thicker on some surfaces and thinner on other surfaces of the fastener 1. For example, the second sealant layer 13 may be applied where the mastic sealant 11 in the second sealant layer 13 is thicker on the concave surface 7 of the head 5 than it is on the flat radial surface 8 of the head 5 and where the mastic sealant 11 in the second sealant layer 13 on the flat radial surface 8 of the head 5 is thicker than it is on the conical buttress 4. The following expression set forth in Equation H below recites the comparative thickness of the second sealant layer 13 on surfaces 4, 7, and 8 using this application scenario:

Surface 7>Surface 8>
Surface 4        Equation H for the second sealant layer 13:

In still other industry specific applications, such as installations where the substrate 14 may contract or shrink excessively due to extreme environmental heat exposure, creating a contraction gap 18, it may be desirable to have excess mastic sealant 11 in the second sealant layer 13 applied to the conical buttress 4 so that as fastener 1 is installed into the substrate 14, a wiping action forces excess mastic sealant 11 upward toward the underside surface 34 of the head 5. This ensures greater coverage of the mastic sealant 11 in the second sealant layer 13 on surfaces of the substrate 14 adjacent to the conical buttress 4. For example, the thickness of the mastic sealant 11 in the second sealant layer 13 on the concave surface 7 and the flat radial surface 8 may be equal, but less than the thickness of the mastic sealant 11 in the second sealant layer 13 on the conical buttress 4. The following expression set forth in Equation I below recites the comparative thickness of the second sealant layer 13 on surfaces 4, 7, and 8 using this application scenario:

Surface 7=Surface 8<
Surface 4        Equation I for the second sealant layer 13:

The first sealant layer 12 and the second sealant layer 13 may or may not have the same type of mastic sealant 11. Any of the examples for the mastic sealant 11 noted above may be used for the first and/or second sealant layers 12, 13. Similarly, the first sealant layer 12 and the second sealant layer 13 may be applied using the same application process or different application processes. Any of the exemplary application processes noted above may be used to apply the first and/or second sealant layers 12, 13 to the fastener 1. Furthermore, the thickness of the first sealant layer 12 may or may not be the same as the thickness of the second sealant layer 13 at any given location on the fastener 1. As noted above, the thickness of the second sealant layer 13 may equal 25 percent to 50 percent of the thickness of the first sealant layer 12 at any given location on the fastener 1.

Still further, the relative state of cure of portions of the first sealant layer 12 may or may not be as cured as equivalent portions of the second sealant layer 13. As noted above, the mastic sealant 11 in the first sealant layer 12 may be in a lower state of cure relative to the mastic sealant 11 in the second sealant layer 13 so that the second sealant layer 13 can shield and protect the mastic sealant 11 in the first sealant layer 12. In such a configuration, the mastic sealant 11 in the first sealant layer 12 flows out of its covered confinement when the second sealant layer 13 ruptures as the fastener 1 is installed into the substrate 14 such that a relatively fresh application of mastic sealant 11 from the first sealant layer 12 flows between the fastener 1 and the substrate 14 to form a water tight seal.

Figure 13:
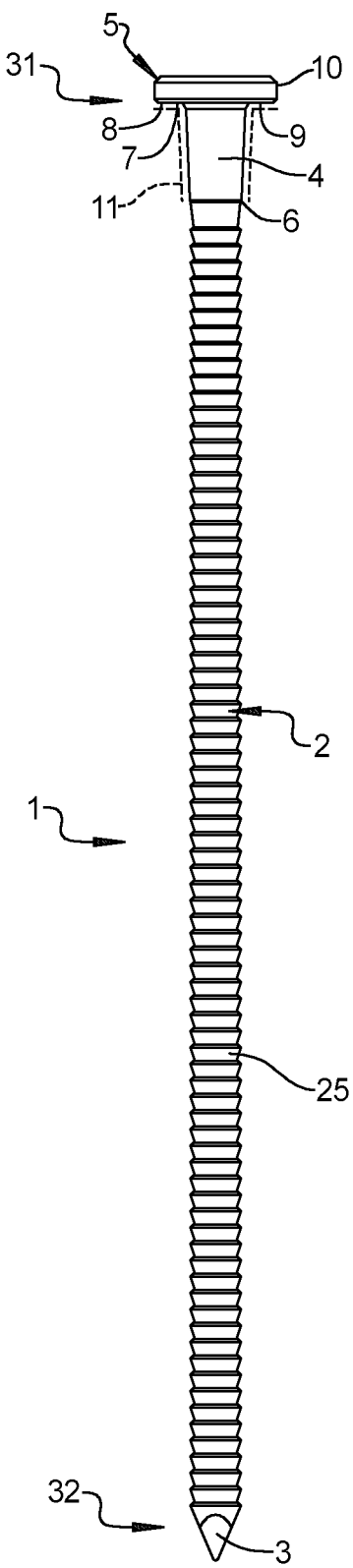
FIG. 13 is a side elevation view of the exemplary fastener illustrated in FIG. 11 where the mastic sealant has been applied to the conical buttress of the shank and the underside surface of the head.
Figure 14:
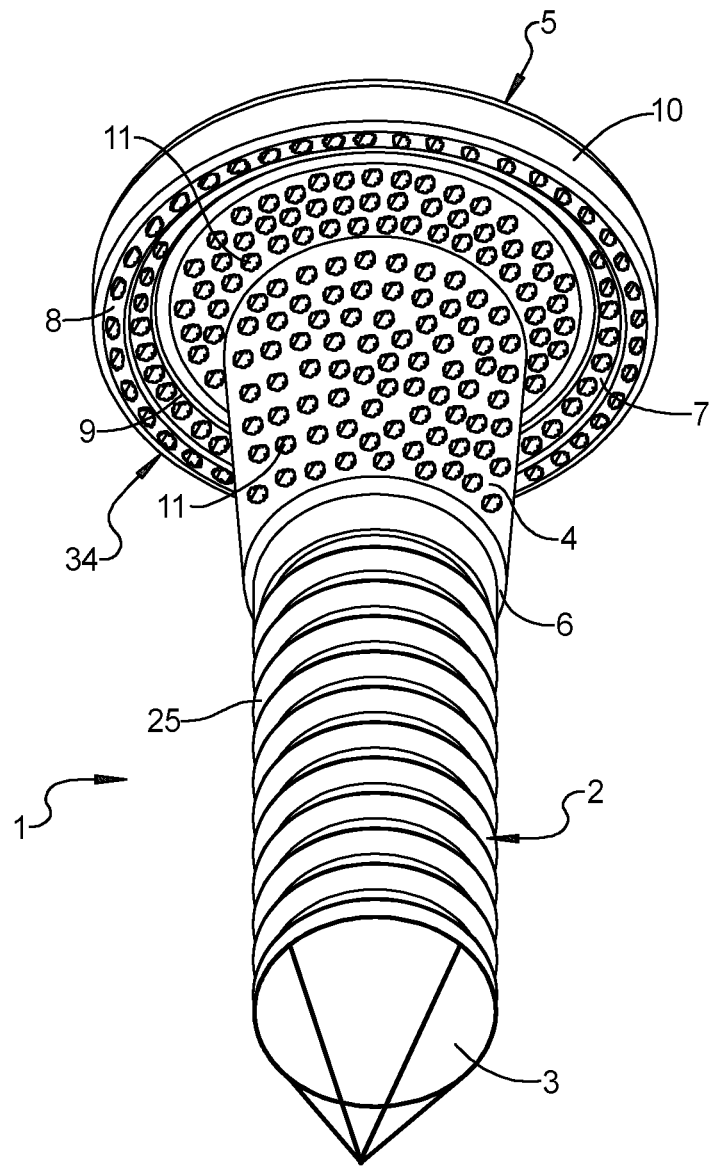
FIG. 14 is a bottom perspective view of the exemplary fastener illustrated in FIG. 13.

Referring to FIGS. 11-14, the shank 2 of the fastener 1 may include a surface treatment such as a plurality of ring-shaped projections 25 that extend annularly about the outer surface 33 of the shank 2. As shown in FIGS. 13 and 14, the mastic sealant 11 is applied to the conical buttress 4 of the shank 2, the concave surface 7 of the head 5, and the flat radial surface 8 of the head 5 in the illustrated embodiment. However, the application and/or locations of the mastic sealant 11 is not necessarily dependent on whether the fastener 1 has a surface treatment on the shank 2.

Figure 15:
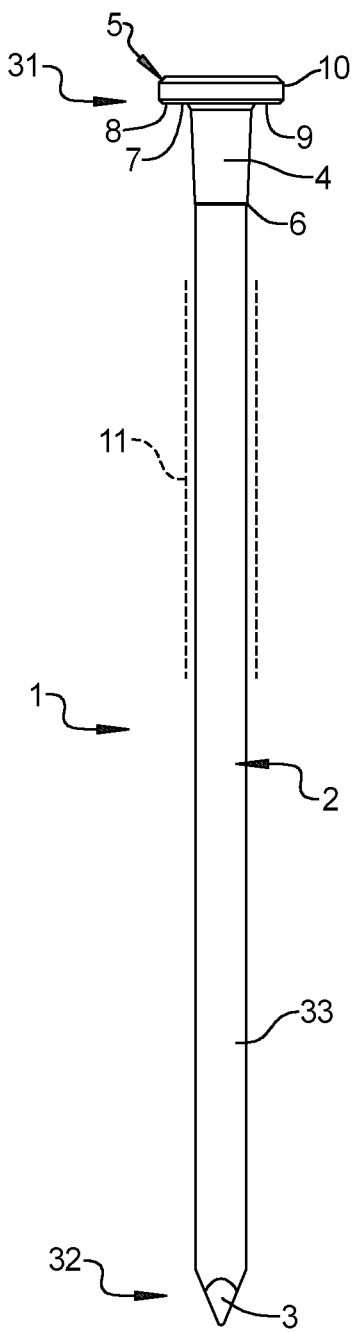
FIG. 15 is a side elevation view of the exemplary fastener illustrated in FIG. 1 where the mastic sealant has been applied to a portion of the shank located between first and second ends of the shank.
Figure 16:
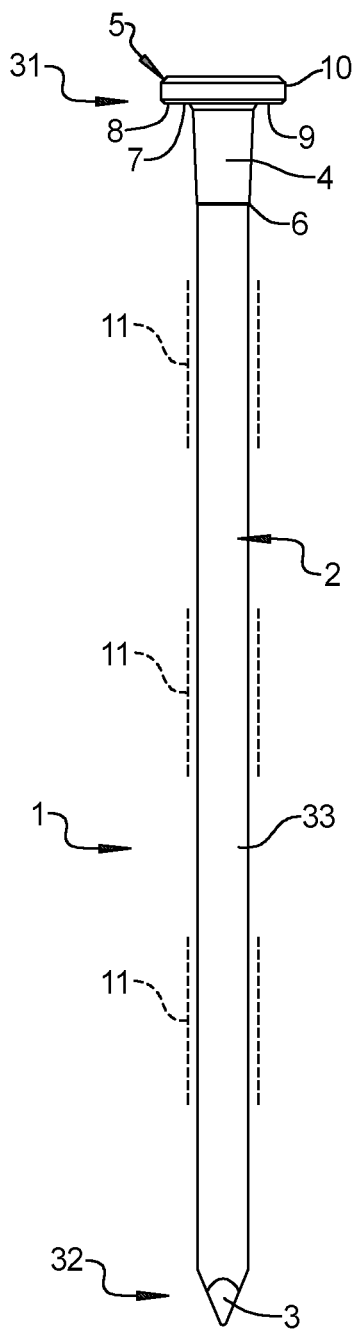
FIG. 16 is a side elevation view of the exemplary fastener illustrated in FIG. 1 where the mastic sealant has been applied to the shank in three separate rings located between the first and second ends of the shank.
Figure 17:
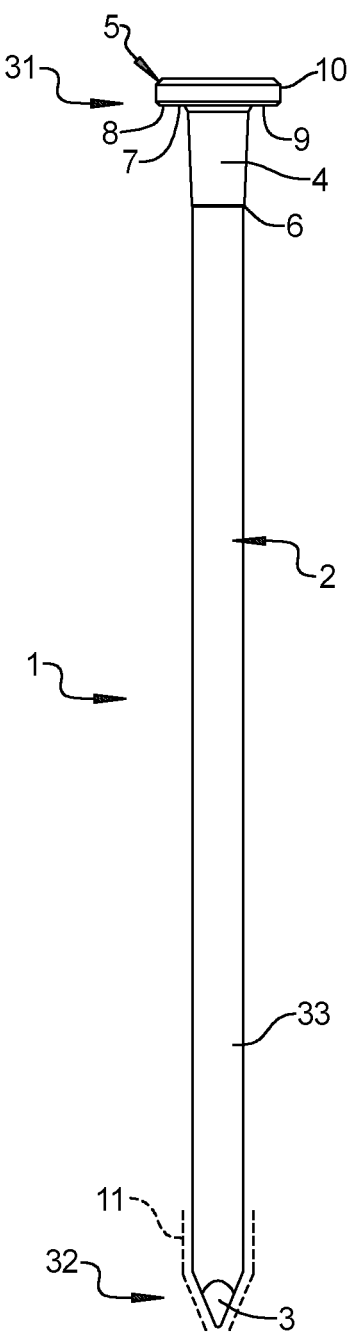
FIG. 17 is a side elevation view of the exemplary fastener illustrated in FIG. 1 where the mastic sealant has been applied to the second end of the shank.
Figure 18:
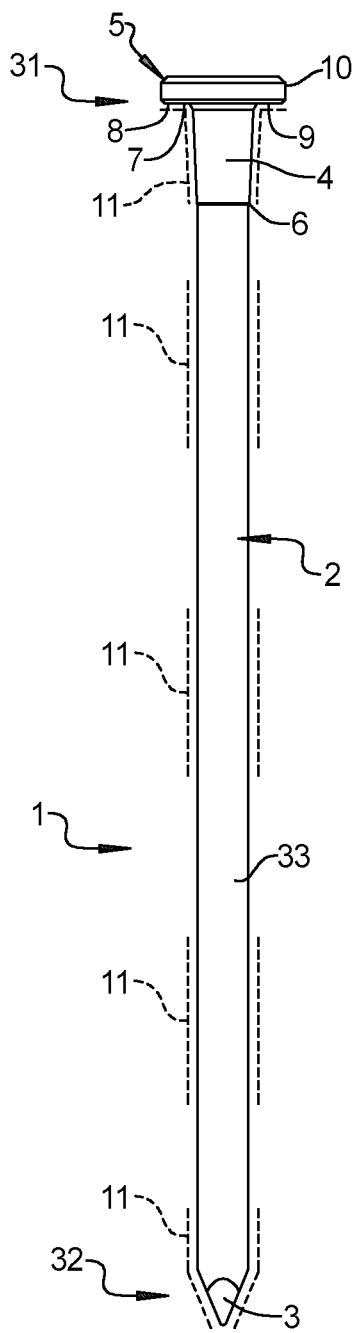
FIG. 18 is a side elevation view of the exemplary fastener illustrated in FIG. 1 where the mastic sealant has been applied to the underside surface of the head, to the first and second ends of the shank, and to the shank in three separate rings located between the first and second ends of the shank.
Figure 19:
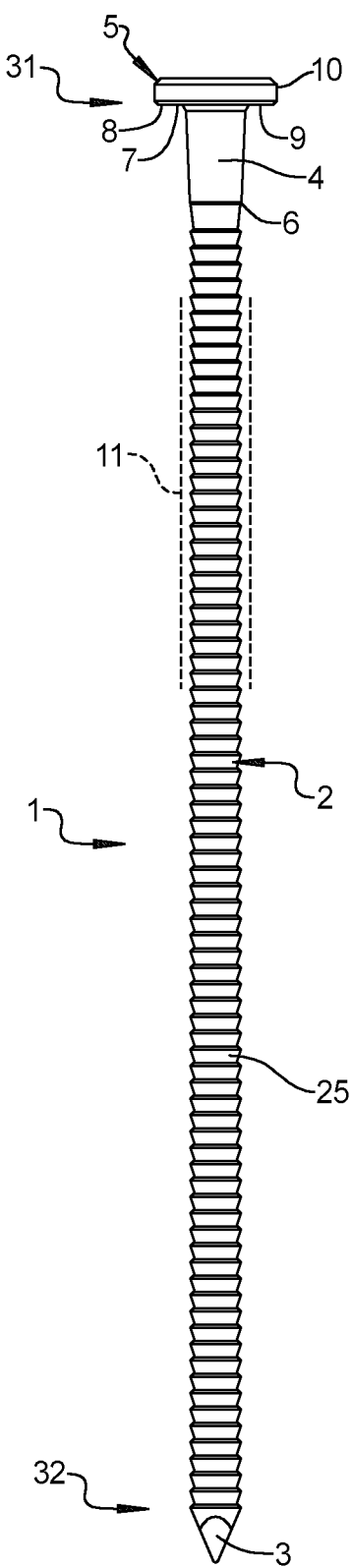
FIG. 19 is a side elevation view of the exemplary fastener illustrated in FIG. 11 where the mastic sealant has been applied to a portion of the shank located between the first and second ends of the shank.
Figure 20:
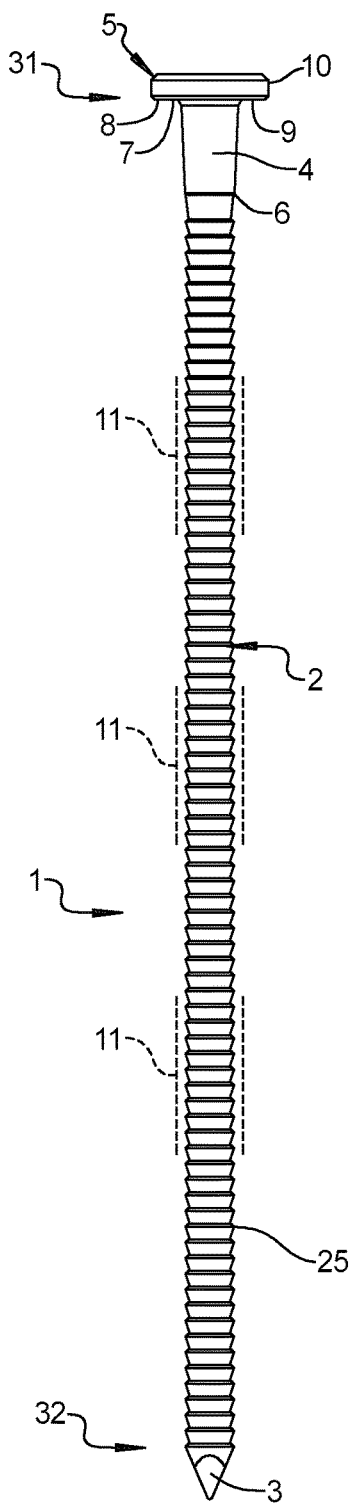
FIG. 20 is a side elevation view of the exemplary fastener illustrated in FIG. 11 where the mastic sealant has been applied to the shank in three separate rings located between the first and second ends of the shank.
Figure 21:
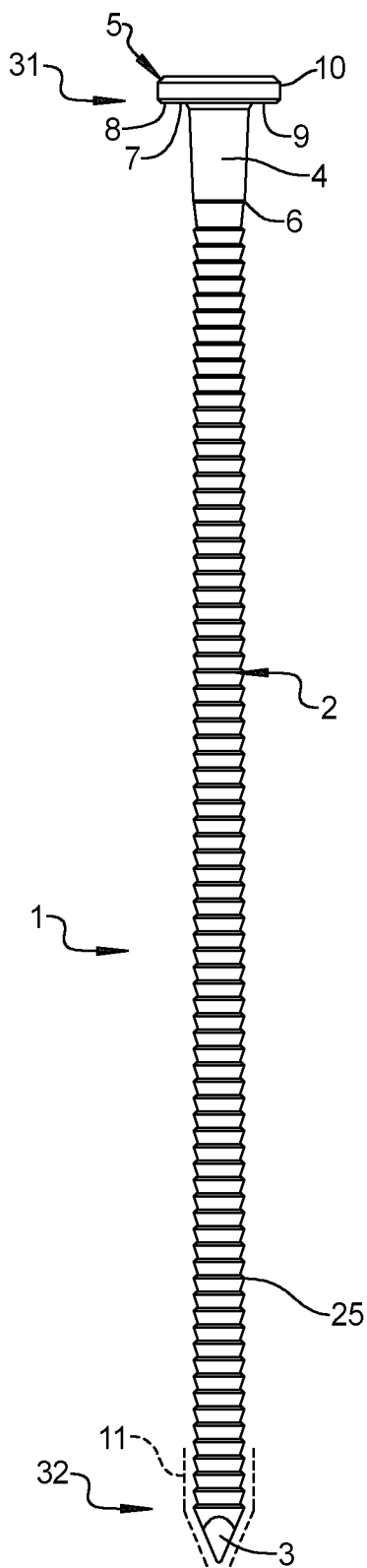
FIG. 21 is a side elevation view of the exemplary fastener illustrated in FIG. 11 where the mastic sealant has been applied to the second end of shank.
Figure 22:
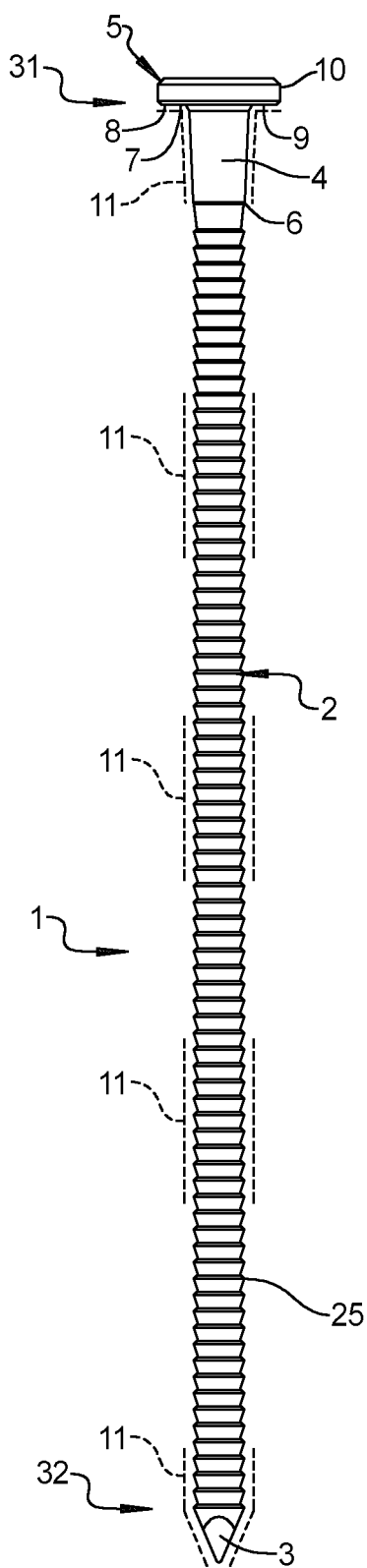
FIG. 22 is a side elevation view of the exemplary fastener illustrated in FIG. 11 where the mastic sealant has been applied to the underside surface of the head, to the first and second ends of the shank, and to the shank in three separate rings located between the first and second ends of the shank.
Figure 23:
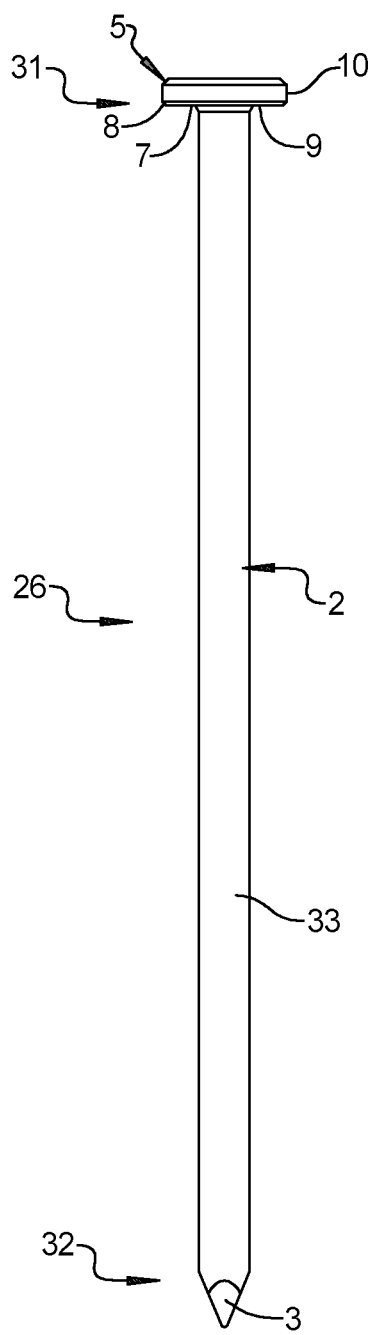
FIG. 23 is a side elevation view of an exemplary fastener constructed in accordance with the subject disclosure where the fastener includes a head and a smooth shank.

Referring to FIGS. 15-22, the mastic sealant 11 may be applied to different locations of the fastener 1. For example, as shown in FIGS. 15 and 19, the mastic sealant 11 may be applied along only a portion of the shank 2 that is located between the first and second ends 31, 32 of the shank 2. Alternatively, the mastic sealant 11 may be applied in three annular strips or rings that are longitudinally spaced from one another between the first and second ends 31, 32 of the shank 2 (FIGS. 16 and 20). As another alternative, the mastic sealant 11 may be applied to second end 32 of the shank 2 at a location adjacent to the point 3 of the fastener 1 (FIGS. 17 and 21). In an alternative embodiment shown in FIGS. 18 and 22, the mastic sealant 11 has been applied to the underside surface 34 of the head 5, to the conical buttress 4, to the second end 32 of the shank 2, and to the outer surface 33 of the shank in three longitudinally spaced rings located between the first and second ends 31, 32 of the shank 2.

Referring to FIGS. 23-28, fastener 26 includes shank 2 and head 5. Fastener 26 does not include the conical buttress 4 of fastener 1. Instead, the shank 2 extends longitudinally between the concave surface 7 of the head and the point 3 of the fastener 26. As shown in FIG. 9, the concave surface 7 of the head 5 is formed by trough 9, which extends annularly about the first end 31 of the shank 2. The relatively flat radial surface 8 is oriented relatively transverse to the shank 2. The flat radial surface 8 extends radially from the concave surface 7 to the outer rim 10 of the head 5.

Figure 24:
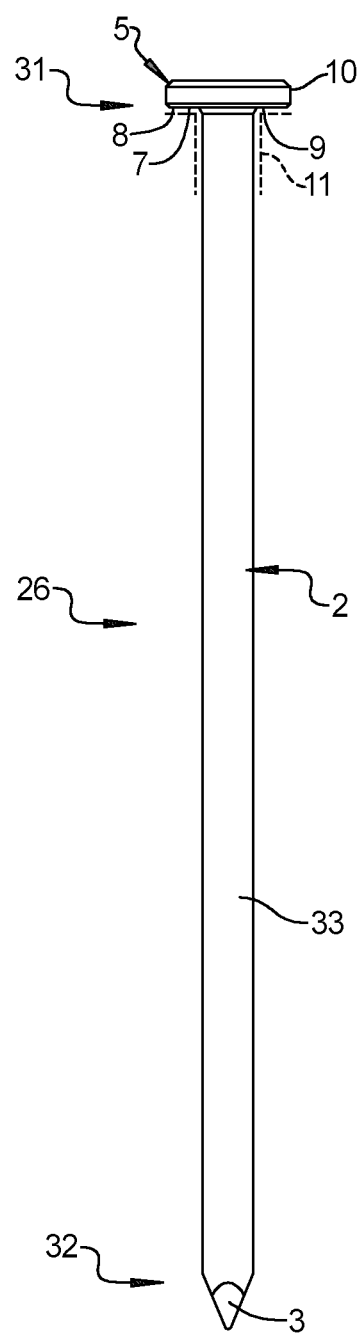
FIG. 24 is a side elevation view of the exemplary fastener illustrated in FIG. 23 where the mastic sealant has been applied to the first end of the shank and the underside surface of the head.
Figure 25:
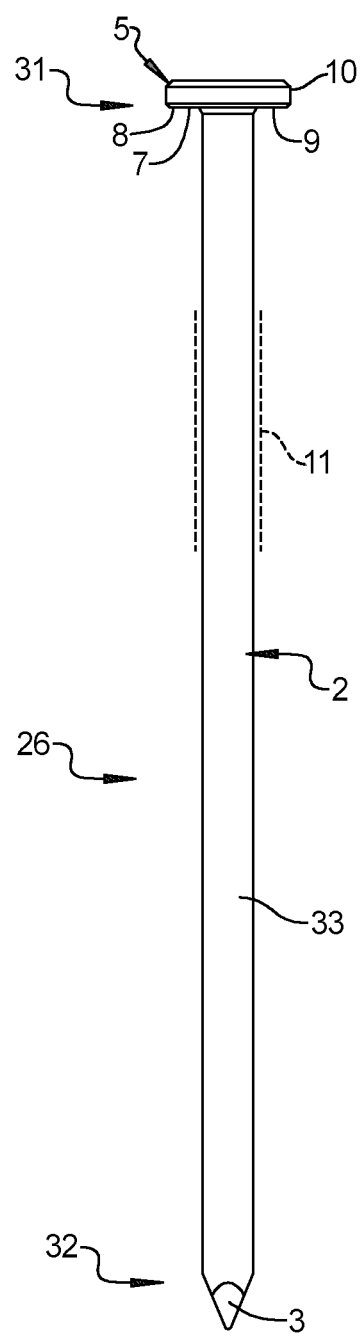
FIG. 25 is a side elevation view of the exemplary fastener illustrated in FIG. 23 where the mastic sealant has been applied to a portion of the shank located between the first and second ends of the shank.
Figure 26:
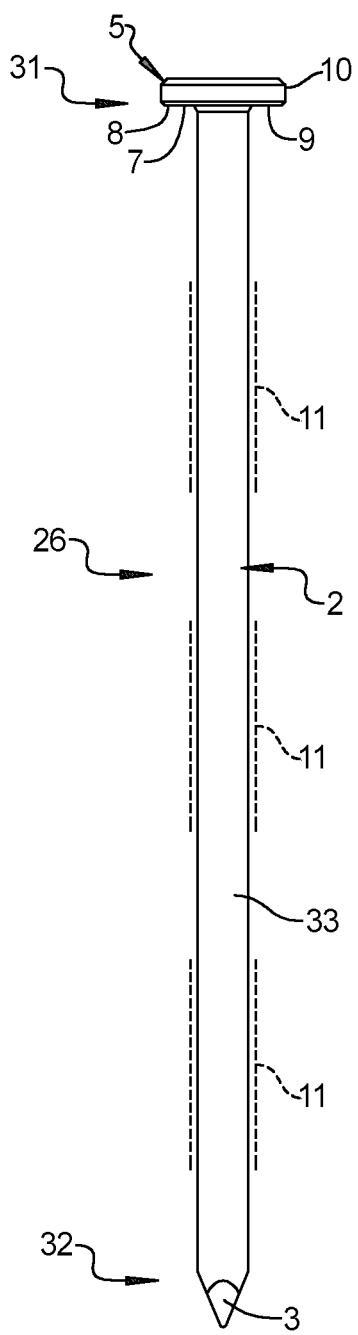
FIG. 26 is a side elevation view of the exemplary fastener illustrated in FIG. 23 where the mastic sealant has been applied to the shank in three separate rings located between the first and second ends of the shank.
Figure 27:
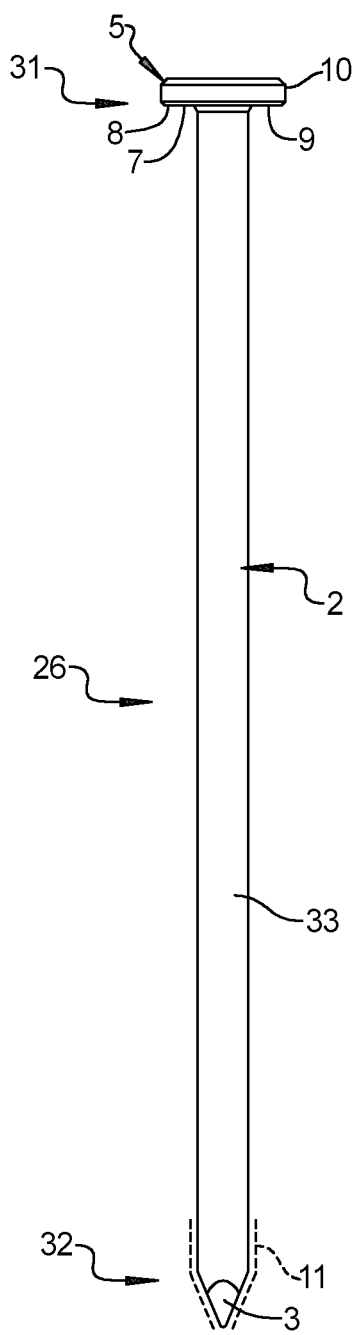
FIG. 27 is a side elevation view of the exemplary fastener illustrated in FIG. 23 where the mastic sealant has been applied to the second end of shank.
Figure 28:
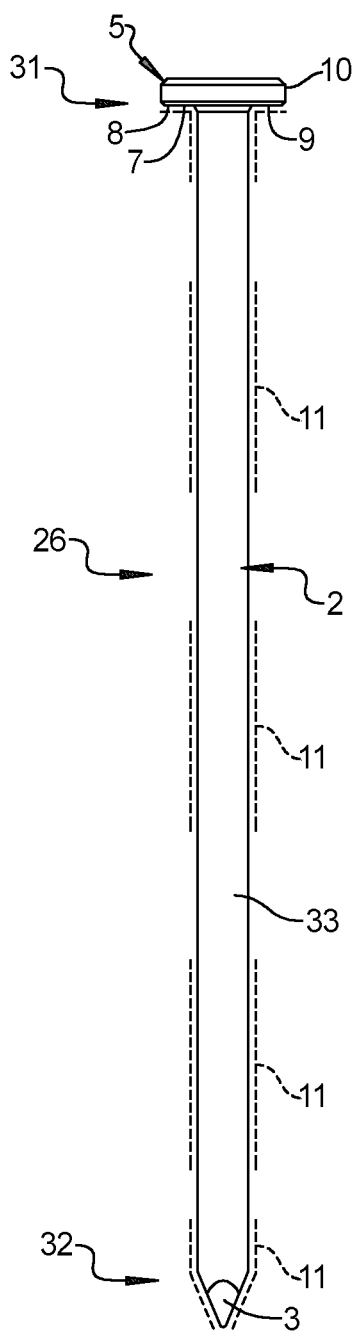
FIG. 28 is a side elevation view of the exemplary fastener illustrated in FIG. 23 where the mastic sealant has been applied to the underside surface of the head, to the first and second ends of the shank, and to the shank in three separate rings located between the first and second ends of the shank.

Mastic sealant 11 is applied to the first end 31 of the shank 2 at a first thickness, to the concave surface 7 of the head 5 at a second thickness, and to the flat radial surface 8 of the head 5 at a third thickness. Although the mastic sealant 11 is shown in FIG. 24 as dotted lines, the mastic sealant 11 covers the entire circumference of the portions and surfaces of the fastener 26 adjacent to the dotted lines. This representation will be consistent throughout the figures of this disclosure.

In some industry specific applications, such as general-purpose fasteners, the mastic sealant 11 may be applied to the fastener 26 in a relatively uniform thickness. In other words, the first thickness of the mastic sealant 11 applied to the first end 31 of the shank 2, the second thickness of the mastic sealant 11 applied to the concave surface 7 of the head 5, and the third thickness of the mastic sealant 11 applied to the flat radial surface 8 of the head 5 are equal. The expression set forth in Equation J below recites the comparative thickness of the mastic sealant 11 on surfaces 2, 7, and 8 using this application scenario:

Surface 2=Surface 7=Surface 8        Equation J:

In other industry specific applications, such as exposed construction with known water exposure, the mastic sealant 11 may be applied to be deliberately thicker on some surfaces and thinner on other surfaces of the fastener 26. For example, the mastic sealant 11 may be thicker on the concave surface 7 than it is on the flat radial surface 8 and the mastic sealant 11 may be thicker on the flat radial surface 8 than it is on the first end of the shank 2. In other words, the second thickness of the mastic sealant 11 applied to the concave surface 7 of the head 5 is greater than the third thickness of the mastic sealant 11 applied to the flat radial surface 8 of the head 5 and the third thickness of the mastic sealant 11 applied to the flat radial surface 8 of the head 5 is greater than the first thickness of the mastic sealant 11 applied to the first end 31 of the shank 2. The expression set forth in Equation K below recites the comparative thickness of the mastic sealant 11 on surfaces 2, 7, and 8 using this application scenario:

Surface 7>Surface 8>Surface 2    Equation K:

In an installation scenario in which fastener 26 is installed in the substrate 14 shown in FIG. 10, contraction and/or shrinkage may occur due to extreme environmental heat exposure. If so, contraction gap 18 will result. In such a scenario, it is desirable to have excess mastic sealant 11 applied to the fastener 26 before it is installed into the substrate 14. A wiping action forces the excess mastic sealant 11 upward toward the underside surface 34 of the head 5. This ensures greater coverage of the mastic sealant 11 on the substrate surface 20 adjacent to the shank 2. In such a scenario, the mastic sealant 11 may be thicker on the first end 31 of the shank 2 and thinner on the concave surface 7 and the flat radial surface 8, which may have equal thicknesses of the mastic sealant 11. In other words, the first thickness of the mastic sealant 11 applied to the first end 31 of the shank 2 is greater than the second thickness of the mastic sealant 11 applied to the concave surface 7 of the head 5 and the third thickness of the mastic sealant 11 applied to the flat radial surface 8 of the head equals the second thickness of the mastic sealant 11 applied to the concave surface 7 of the head 5. The expression set forth in Equation L below recites the comparative thickness of the mastic sealant 11 using this application scenario:

Surface 7=Surface 8<Surface 2    Equation L:

The fastener 26 shown in FIGS. 23-28 may have any one of multiple variations of applied thicknesses of the mastic sealant 11 provided to meet industry specific requirements. All such variations may be provided using the same or different mastic sealant 11 and the same or different application methods. Application methods suitable for applying the mastic sealant 11 to the fastener 26 include, but are not limited to dipping, masking certain portions of the fastener 26 to prevent application, brushing, spraying, electrostatic spraying, transferring, silk screen, and other similar methods and techniques. The scope of this disclosure does not depend upon the method used to apply the mastic sealant to the fastener 26. The mastic sealant 11 applied to the fastener 26 may be any one of several readily available mastics sealants and/or mastic-like products, such as silicone based sealants, elastomer based sealants, coal tar and/or petroleum byproduct sealants, caulk-like sealants, epoxy sealants, and other similar products which retain a relatively resilient characteristic over time.

The fastener 26 shown in FIGS. 23-28 has a smooth shank 2, but alternatively could include a surface treatment, such as the ring-shaped protrusions 25 shown in FIGS. 11-14. The fastener 26 may also include a two-layer mastic sealant application like the two-layer mastic sealant depicted in FIGS. 7 and 8. The applications and/or locations of the mastic sealant 11 and/or the combination of the first sealant layer 12 and the second sealant layer 13 are not dependent on whether the fastener 26 has a surface treatment feature applied on the shank 2.

Figure 29:
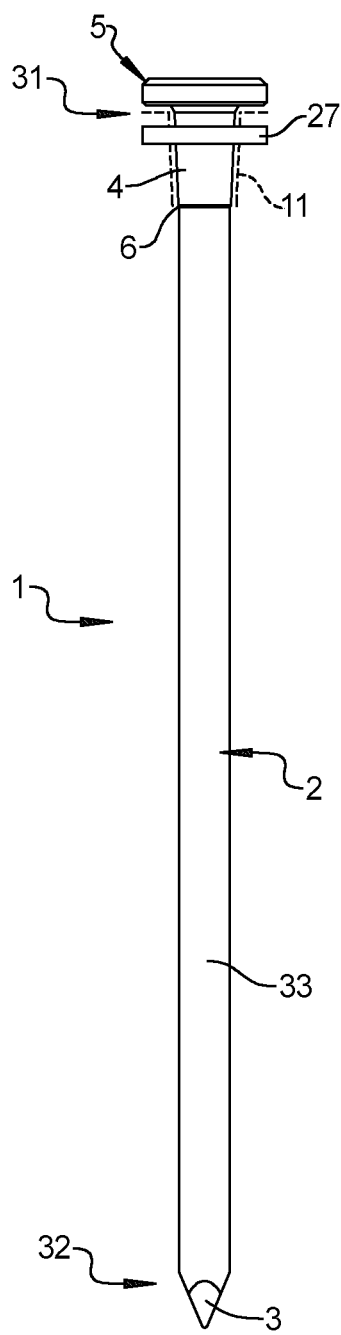
FIG. 29 is a side elevation view of the exemplary fastener illustrated in FIG. 4 where a washer has been slid over the shank.
Figure 30:
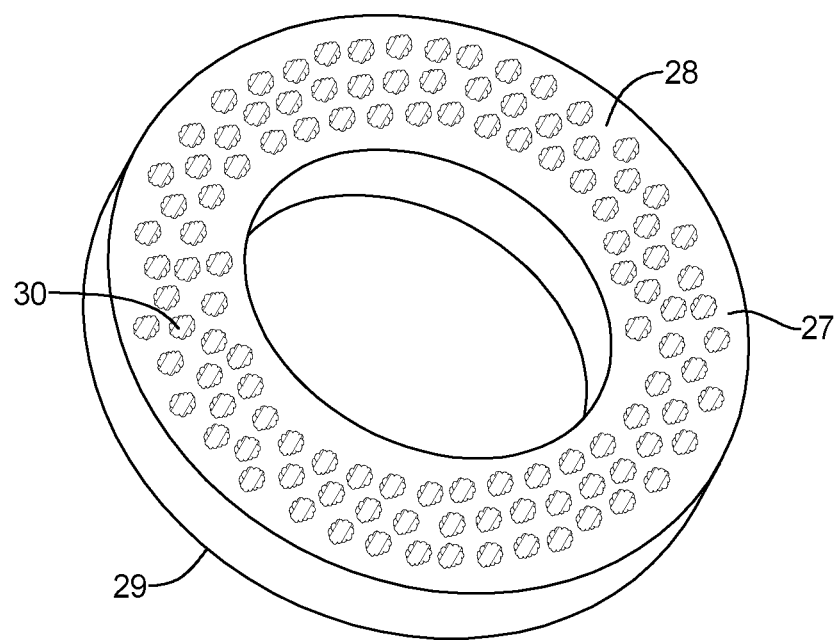
FIG. 30 is a top perspective view of the washer illustrated in FIG. 29 where the mastic sealant that has been applied to a top surface of the washer is shown.
Figure 31:
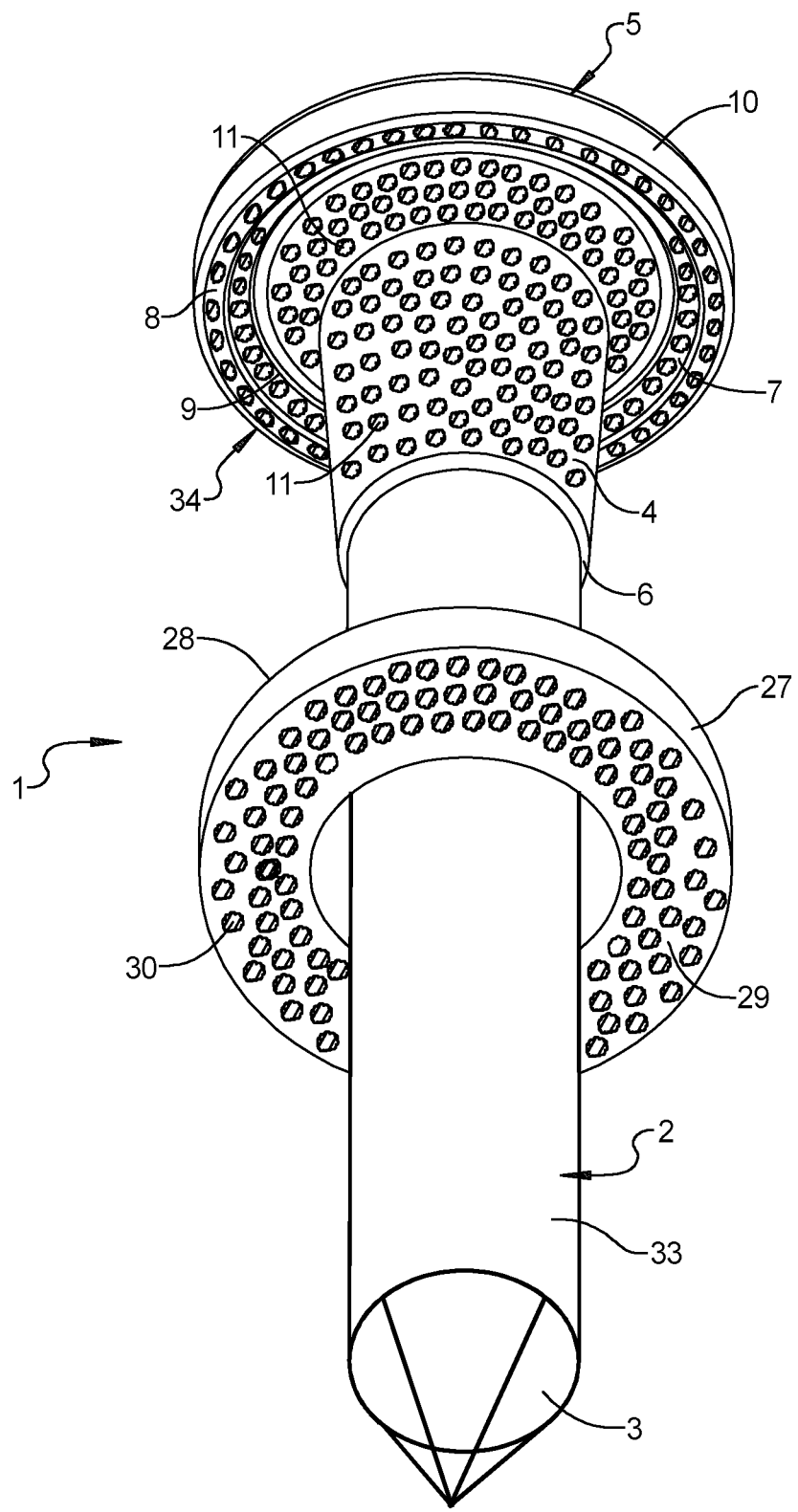
FIG. 31 is a bottom perspective view of the exemplary fastener and washer illustrated in FIG. 29 where the mastic sealant that has been applied to a bottom surface of the washer, to the conical buttress of the shank, and to the underside of the head is shown.

Referring to FIGS. 29-31, the fastener 1 of FIGS. 4-6 is shown with a sealing washer 27 assembled over the shank 2 of the fastener 1. The sealing washer includes a top surface 28 that faces the underside surface 34 of the head 5 of the fastener 1 and a bottom surface 29 opposite the top surface 28. One of the benefits of the sealing washer 27 is that it provides a water tight connection as the sealing washer 27 is pressed against and/or into the substrate 14 by the head 5 of the fastener 1 during installation. Mastic sealant 30 is applied to at least one of the top and bottom surface 28, 29 of the sealing washer 27. In most industrial applications, it is preferred to apply the mastic sealant 30 to both the top and bottom surfaces 28, 29 of the sealing washer 27 so that the sealing washer 27 does not have to be assembled on the fastener 1 in a specific orientation (i.e., with either the mastic sealant 30 on the top surface or the bottom surface).

The mastic sealant 30 on the top surface 28 mates against the mastic sealant 11 on the underside surface 34 of the head 5 when the sealing washer 27 is assembled on the shank 2 of the fastener 1. The mastic sealant 30 on the sealing washer 27 may or may not be similar and/or the same material as the mastic sealant 11 on the fastener 1. The mastic sealants 11, 30 are compatible, if not identical, so that a seal is formed between them. Excess combined mastic sealant 11, 30 is squeezed into the gap 18 and onto the substrate 14 surfaces to form an improved seal between the fastener 1, the sealing washer 27, and the substrate 14. The combined mastic sealant 11, 30 will remain resilient and flexible over time regardless of formation and/or increasing contraction of the gap 18.

It is not necessary, but it is likely, that the thickness of the mastic sealant 30 applied to the top and bottom surfaces 28, 29 of the sealing washer 27 will be a similar thickness. However, the thickness of the mastic sealant 30 that is applied to the top and bottom surfaces 28, 29 of the sealing washer 27 will not necessarily be the same as the thickness of the mastic sealant 11 applied to the fastener 1. It should be appreciated that the sealing washer 27 can be made of metal, plastic, fiber, or one of many other appropriate materials. The mastic sealant 30 is applied to the sealing washer 27 using any one of the application methods described above. It should also be appreciated that the sealing washer 27 could alternatively be assembled with the fastener 26 shown in FIG. 24, for example.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:
1. A self-sealing fastener comprising:
   a shank extending longitudinally between a first end and a second end, said shank having an outer surface;
   a head extending radially outwardly from said first end of said shank, said head having an underside surface adjacent to said first end of said shank and a topside surface opposite said underside surface;

a sealing washer extending annularly about said shank, said sealing washer including a top surface facing said underside surface of said head and a bottom surface opposite said top surface;

a mastic sealant disposed on said outer surface of said shank adjacent to said first end of said shank and adjacent to at least one of said second end of said shank and said underside surface of said head for providing a water-tight seal after installation of the self-sealing fastener and disposed on at least one of said top and bottom surfaces of said sealing washer prior to assembly about the shank; and a point disposed at said second end of said shank.

2. The self-sealing fastener as set forth in claim 1, wherein said mastic sealant is disposed on said underside surface of said head.

3. The self-sealing fastener as set forth in claim 2, wherein said head includes an outer rim, wherein said underside surface of said head includes a concave surface defined by a trough that extends annularly about said first end of said shank and a flat radial surface that is positioned radially between said concave surface and said outer rim, and wherein said mastic sealant is disposed on said flat radial surface and said concave surface on said underside surface of said head.

4. The self-sealing fastener as set forth in claim 2, wherein said shank has a shank diameter, wherein said shank includes a conical buttress at said first end, and wherein said shank diameter progressively increases along said conical buttress moving towards said head.

5. The self-sealing fastener as set forth in claim 4, wherein said mastic sealant is disposed on said conical buttress of said shank.

6. The self-sealing fastener as set forth in claim 4, further comprising a transition point where the conical buttress contacts the outer surface of the shank.

7. The self-sealing fastener as set forth in claim 6, wherein the transition point comprises a radius or a chamfer between the outer surface of the shank and the conical buttress.

8. The self-sealing fastener as set forth in claim 1, wherein said mastic sealant includes a first sealant layer and a second sealant layer, wherein said first sealant layer directly contacts at least one of said outer surface of said shank and said underside surface of said head, and wherein said second sealant layer is disposed on said first sealant layer.

9. The self-sealing fastener as set forth in claim 8, wherein said mastic sealant in said second sealant layer is cured more than said mastic sealant in said first sealant layer such that said second sealant layer forms a protective skin around said first sealant layer.

10. The self-sealing fastener as set forth in claim 9, wherein said mastic sealant in said second sealant layer has a higher viscosity than said mastic sealant in said first sealant layer.

11. The self-sealing fastener as set forth in claim 8, wherein said mastic sealant in said first sealant layer is different from said mastic sealant in said second sealant layer.

12. The self-sealing fastener as set forth in claim 8, wherein said mastic sealant in said first sealant layer has a first sealant layer thickness and said second sealant layer has a second sealant layer thickness that equals 25 to 50 percent of said first sealant layer thickness.

13. The self-sealing fastener as set forth in claim 1, wherein said mastic sealant is one of a silicone based sealant, an elastomer based sealant, a caulk based sealant, an epoxy based sealant, a petroleum byproduct sealant, and coal tar.

14. The self-sealing fastener as set forth in claim 1, wherein said mastic sealant disposed on said top and bottom surfaces of said sealing washer.

15. The self-sealing fastener as set forth in claim 1, wherein said outer surface of said shank comprises a ring structure, a break-a-way groove, a thread, or a combination thereof.

16. A self-sealing fastener comprising:

a shank extending longitudinally between a first end and a second end, said shank having an outer surface;

a head extending radially outwardly from said first end of said shank to an outer rim, said head having an underside surface adjacent to said first end of said shank and a topside surface opposite said underside surface;

said underside surface of said head including a concave surface defined by an annular trough and a flat radial surface positioned radially between said concave surface and said outer rim; and a mastic sealant disposed on said outer surface of said shank adjacent to said first end at a first thickness, said concave surface of said underside surface of said head at a second thickness, and said flat radial surface of said underside surface of said head at a third thickness.

17. The self-sealing fastener as set forth in claim 16, wherein said first thickness of said mastic sealant, said second thickness of said mastic sealant, and said third thickness of said mastic sealant are equal.

18. The self-sealing fastener as set forth in claim 16, wherein said second thickness of said mastic sealant is greater than said third thickness of said mastic sealant and wherein said third thickness of said mastic sealant is greater than said first thickness of said mastic sealant.

19. The self-sealing fastener as set forth in claim 16, wherein said first thickness of said mastic sealant is greater than said second thickness of said mastic sealant and wherein said third thickness of said mastic sealant equals said second thickness of said mastic sealant.

20. The self-sealing fastener of claim 16, further comprising:

a point disposed at said second end of said shank.

21. The self-sealing fastener as set forth in claim 20, wherein said mastic sealant is further disposed on said outer surface of said shank adjacent to said second end of said shank.

22. A method of installing a self-sealing fastener in a substrate, the self-sealing fastener including a head and a shank that extends from an underside surface of the head, the method comprising the steps of:

applying a first layer of mastic sealant to at least one of the shank of the self-sealing fastener and the underside surface of the head of the self-sealing fastener;

applying a second layer of mastic sealant over the first layer of mastic sealant before the first layer of mastic sealant is fully cured such that the second layer of mastic sealant forms a protective skin over the first layer of mastic sealant, wherein a thickness of the second layer of mastic sealant is in a range of 25 to 50 percent of a thickness of the first layer of mastic sealant;

curing the mastic sealant in said second sealant layer more than said mastic sealant in said first sealant layer such that said second sealant layer forms a protective skin around said first sealant layer, wherein said mastic sealant in said second sealant layer has a higher viscosity than said mastic sealant in said first sealant layer; and forcing the shank of the self-sealing fastener into the substrate where the second layer of mastic sealant ruptures as the second layer of mastic sealant makes contact with the substrate to enable the first layer of mastic sealant to flow between the self-sealing fastener and the substrate and form a water-tight seal.

23. A self-sealing fastener comprising:

a shank extending longitudinally between a first end and a second end, said shank having an outer surface;

a head extending radially outwardly from said first end of said shank, said head having an underside surface adjacent to said first end of said shank and a topside surface opposite said underside surface;

a mastic sealant disposed on at least one of said outer surface of said shank adjacent said second end of said shank and said underside surface of said head for providing a water-tight seal after installation of the self-sealing fastener, said mastic sealant includes a first sealant layer and a second sealant layer, wherein said first sealant layer directly contacts at least one of said outer surface of said shank and said underside surface of said head, and wherein said second sealant layer is disposed on said first sealant layer; and a point disposed at said second end of said shank, wherein said mastic sealant in said second sealant layer is cured more than said mastic sealant in said first sealant layer such that said second sealant layer forms a protective skin around said first sealant layer and said mastic sealant in said second sealant layer has a higher viscosity than said mastic sealant in said first sealant layer.

24. The self-sealing fastener as set forth in claim 23, wherein said mastic sealant in said first sealant layer is different from said mastic sealant in said second sealant layer.

25. The self-sealing fastener as set forth in claim 23, wherein said mastic sealant in said first sealant layer has a first sealant layer thickness and said second sealant layer has a second sealant layer thickness that equals 25 to 50 percent of said first sealant layer thickness.

26. A self-sealing fastener comprising:

a shank extending longitudinally between a first end and a second end, said shank having an outer surface;

a head extending radially outwardly from said first end of said shank and comprising an outer rim wherein said underside surface of said head includes a concave surface defined by a trough that extends annularly about said first end of said shank and a flat radial surface that is positioned radially between said concave surface and said outer rim, said head having an underside surface adjacent to said first end of said shank and a topside surface opposite said underside surface;

a mastic sealant disposed on said flat radial surface and said concave surface on said underside surface of said head and further disposed on said outer surface of said shank adjacent to said first end of said shank and adjacent to at least one of said second end of said shank and said underside surface of said head for providing a water-tight seal after installation of the self-sealing fastener, wherein said mastic sealant is one of a silicone based sealant, an elastomer based sealant, a caulk based sealant, an epoxy based sealant, a petroleum byproduct sealant, and coal tar; and a point disposed at said second end of said shank.

* * * * *